US012764825B2

(12) United States Patent
Zhang et al.

(10) Patent No.: US 12,764,825 B2
(45) Date of Patent: Oct. 13, 2026

(54) LOW POWER DATA COMMUNICATIONS

(71) Applicant: APPLE INC., Cupertino, CA (US)

(72) Inventors: Lijie Zhang, Beijing (CN); Lele Cui, Beijing (CN); Kai Zhang, Beijing (CN); Yong Zhong, Beijing (CN); Zhiwei Wang, Beijing (CN); Qiang Miao, Beijing (CN)

(73) Assignee: Apple Inc., Cupertino, CA (US)

( * ) Notice: Subject to any disclaimer, the term of this patent is extended or adjusted under 35 U.S.C. 154(b) by 436 days.

(21) Appl. No.: 17/919,466

(22) PCT Filed: Oct. 19, 2021

(86) PCT No.: PCT/CN2021/124756
§ 371 (c)(1),
(2) Date: Oct. 17, 2022

(87) PCT Pub. No.: WO2023/065120
PCT Pub. Date: Apr. 27, 2023

(65) Prior Publication Data
US 2023/0269818 A1 Aug. 24, 2023

(51) Int. Cl.
*H04W 76/28* (2018.01)
*H04W 72/1268* (2023.01)

(52) U.S. Cl.
CPC ....... *H04W 76/28* (2018.02); *H04W 72/1268* (2013.01)

(58) Field of Classification Search
CPC . H04W 76/28; H04W 72/1268; H04W 88/06; Y02D 30/70
See application file for complete search history.

(56) References Cited

U.S. PATENT DOCUMENTS

| | | | | |
|---|---|---|---|---|
| 2010/0091758 A1* | 4/2010 | Goteti | H04W 72/1268 | 370/345 |
| 2013/0021995 A1* | 1/2013 | Ehsan | H04W 72/21 | 370/329 |
| 2013/0182624 A1* | 7/2013 | Sun | H04W 52/0212 | 370/311 |
| 2014/0064160 A1* | 3/2014 | Verger | H04W 52/0216 | 370/329 |
| 2017/0070909 A1* | 3/2017 | Kim | H04W 52/0222 | |

(Continued)

FOREIGN PATENT DOCUMENTS

| | | |
|---|---|---|
| CN | 101795497 | 8/2010 |
| WO | WO 2021015477 | 1/2021 |

OTHER PUBLICATIONS

OPPO, "Details of SR procedure," 3GPP TSG RAN WG2, #99-Bis, R2-1710128 revision of R2-1707736, Prague, Czech Republic, Oct. 9-13, 2017, 5 pages.

*Primary Examiner* — Hassan A Phillips
*Assistant Examiner* — Sang C Lee
(74) *Attorney, Agent, or Firm* — Fish & Richardson P.C.

(57) ABSTRACT

Techniques for low power voice communications include determining a time between an arrival of data for uplink transmission by a device and a scheduling request (SR) occasion, the SR occasion occurring after the arrival of the data and within an on duration of a discontinuous reception (DRX) cycle, and delaying transmission of a SR by the device during a time period that begins at the arrival of the data for uplink transmission and continues for the determined time.

18 Claims, 15 Drawing Sheets

(56) References Cited

U.S. PATENT DOCUMENTS

| | | | | |
|---|---|---|---|---|
| 2017/0208619 | A1* | 7/2017 | Yang | H04W 72/21 |
| 2017/0339744 | A1* | 11/2017 | Latheef | H04W 52/0235 |
| 2017/0359779 | A1* | 12/2017 | Wang | H04W 40/005 |
| 2018/0014322 | A1* | 1/2018 | Loehr | H04W 28/0278 |
| 2018/0124701 | A1* | 5/2018 | Jhang | H04W 52/0216 |
| 2018/0343686 | A1* | 11/2018 | Manepalli | H04W 76/28 |
| 2020/0288488 | A1* | 9/2020 | Park | H04W 72/23 |
| 2023/0007640 | A1* | 1/2023 | Kumar | H04W 72/56 |

* cited by examiner

LOW POWER DATA COMMUNICATIONS

CLAIM OF PRIORITY

This application claims priority under 35 U.S.C. 371 to International Application No. PCT/CN2021/124756, filed on Oct. 19, 2021, the entire contents of which are hereby incorporated by reference.

TECHNICAL FIELD

This disclosure relates generally to techniques for reducing power consumption during voice and other data communications.

BACKGROUND

Various techniques have been used to reduce the power that a portable device consumes to send and receive data. One such technique is to configure the device to enter a low-power "sleep" mode when there is no data transfer at the device. However, if another network node attempts to send data to the device while the device is in the sleep mode, then the device may be unable to receive the data.

To address this, the 3rd Generation Partnership Project (3GPP) has defined a Discontinuous Reception (DRX) scheme in which a device alternates between a low-power sleep mode and a higher power awake mode. By synchronizing the network and the device such that data transmitted by the network is received at the device while the device is in the awake mode, power consumption at the device can be reduced while ensuring reliable data transmission.

SUMMARY

The technology described here uses adaptive scheduling request (SR) delay and packet bundling techniques to reduce power consumption at a user equipment (UE) during Connected-Mode Discontinuous Reception (CDRX) operation. In particular, a SR can be adaptively delayed to allow the UE to observe whether the network has enabled uplink pre-scheduling during the on duration of the CDRX cycle before transmission. By doing so, the UE can make an informed decision to not trigger the SR if uplink pre-scheduling is enabled during the on duration of the CDRX cycle, or to trigger the SR with low power consumption (e.g., without an additional wake-up period) if network pre-scheduling is disabled. In some examples, adaptive packet bundling techniques are used to further reduce power consumption and/or latency.

In general, in a first aspect, a method includes determining a time between an arrival of data for uplink transmission by a device and a SR occasion, the SR occasion occurring after the arrival of the data and within an on duration of a discontinuous reception (DRX) cycle, and delaying transmission of a SR by the device during a time period that begins at the arrival of the data for uplink transmission and continues for the determined time.

In general, in a second aspect, a device includes at least one processor and at least one computer-readable storage device storing instructions executable by the at least one processor to perform operations including determining a time between an arrival of data for uplink transmission by the device and a SR occasion, the SR occasion occurring after the arrival of the data and within an on duration of a DRX cycle, and delaying transmission of a SR by the device during a time period that begins at the arrival of the data for uplink transmission and continues for the determined time.

In general, in a third aspect, at least one non-transitory computer-readable storage medium stores instructions executable by at least one processor to perform operations including determining a time between an arrival of data for uplink transmission and a SR occasion, the SR occasion occurring after the arrival of the data and within an on duration of a DRX cycle, and delaying transmission of a SR during a time period that begins at the arrival of the data for uplink transmission and continues for the determined time.

In general, in a fourth aspect combinable with any of the first through third aspects, operations of the process include setting a timer for the determined time upon reception of the data for uplink transmission, wherein the device is configured to delay transmission of the SR while the timer is active.

In general, in a fifth aspect combinable with any of the first through fourth aspects, operations of the process include detecting an absence of an uplink grant during the time period, and transmitting the SR after the time period in response to the absence of the uplink grant.

In general, in a sixth aspect combinable with any of the first through fifth aspects, operations of the process include detecting an uplink grant during the time period, and transmitting the data after the time period without transmission of the SR in response to the uplink grant.

In general, in a seventh aspect combinable with any of the first through sixth aspects, the data comprises voice data packets. In some examples, the data includes at least two data packets (e.g., voice data packets) bundled together.

In general, in an eighth aspect combinable with any of the first through seventh aspects, operations of the process include identifying a first bundling point for the at least two data packets according to a first bundling pattern and a second bundling point for the at least two data packets according to a second bundling pattern, determining a first time between the first bundling point and the SR occasion, determining a second time between the second bundling point and the SR occasion, and selecting the first bundling pattern or the second bundling pattern for bundling the at least two data packets based on the shorter of the first time and the second time.

In general, in a ninth aspect combinable with the eighth aspect, a number of data packets bundled together is determined based on a power level of the device, a multiple-subscriber identification module (SIM) configuration of the device, or combinations of them, among others.

In general, in a tenth aspect, a method includes identifying a first bundling point for bundling at least two uplink data packets according to a first bundling pattern, identifying a second bundling point for bundling the at least two data packets according to a second bundling pattern that is different from the first bundling pattern, determining a first time between the first bundling point and a SR occasion, the SR occasion occurring within an on duration of a DRX cycle, determining a second time between the second bundling point and the SR occasion, and selecting the first bundling pattern or the second bundling pattern for bundling the at least two data packets based on the shorter of the first time and the second time.

In general, in an eleventh aspect, a device includes at least one processor and at least one computer-readable storage device storing instructions executable by the at least one processor to perform operations including identifying a first bundling point for bundling at least two uplink data packets according to a first bundling pattern, identifying a second bundling point for bundling the at least two data packets according to a second bundling pattern that is different from the first bundling pattern, determining a first time between the first bundling point and a SR occasion, the SR occasion occurring within an on duration of a DRX cycle, determining a second time between the second bundling point and the SR occasion, and selecting the first bundling pattern or the second bundling pattern for bundling the at least two data packets based on the shorter of the first time and the second time.

In general, in a twelfth aspect, at least one non-transitory computer-readable storage medium stores instructions executable by at least one processor to perform operations including identifying a first bundling point for bundling at least two uplink data packets according to a first bundling pattern, identifying a second bundling point for bundling the at least two data packets according to a second bundling pattern that is different from the first bundling pattern, determining a first time between the first bundling point and a SR occasion, the SR occasion occurring within an on duration of a DRX cycle, determining a second time between the second bundling point and the SR occasion, and selecting the first bundling pattern or the second bundling pattern for bundling the at least two data packets based on the shorter of the first time and the second time.

In general, in a thirteenth aspect combinable with any of the tenth through twelfth aspects, the at least two data packets comprise voice data packets.

In general, in a fourteenth aspect combinable with any of the tenth through thirteenth aspects, the first bundling pattern includes bundling an earlier-arriving packet of the at least two data packets with a later-arriving packet of the at least two packets, and the first bundling point includes an arrival time of the later-arriving packet.

In general, in a fifteenth aspect combinable with any of the tenth through thirteenth aspects, the first bundling pattern includes bundling a later-arriving packet of the at least two data packets with an earlier-arriving packet of the at least two packets, and the first bundling point includes an arrival time of the earlier-arriving packet.

In general, in a sixteenth aspect combinable with any of the tenth through fifteenth aspects, a number of the at least two data packets bundled together is determined based on a power level of a device (e.g., the transmitting device).

In general, in a seventeenth aspect combinable with any of the tenth through sixteenth aspects, a number of the at least two data packets bundled together is determined based on a multiple-SIM configuration of a device (e.g., the transmitting device).

In general, in an eighteenth aspect combinable with any of the tenth through seventeenth aspects, the first bundling pattern is the selected bundling pattern, and operations of the process include delaying transmission of a SR during a time period that begins at the first bundling point and continues for the first time.

The details of one or more implementations are set forth in the accompanying drawings and the description below. Other features and advantages will be apparent from the description and drawings, and from the claims.

BRIEF DESCRIPTION OF DRAWINGS

Like reference symbols in the various drawings indicate like elements.

DETAILED DESCRIPTION

Figure 1:
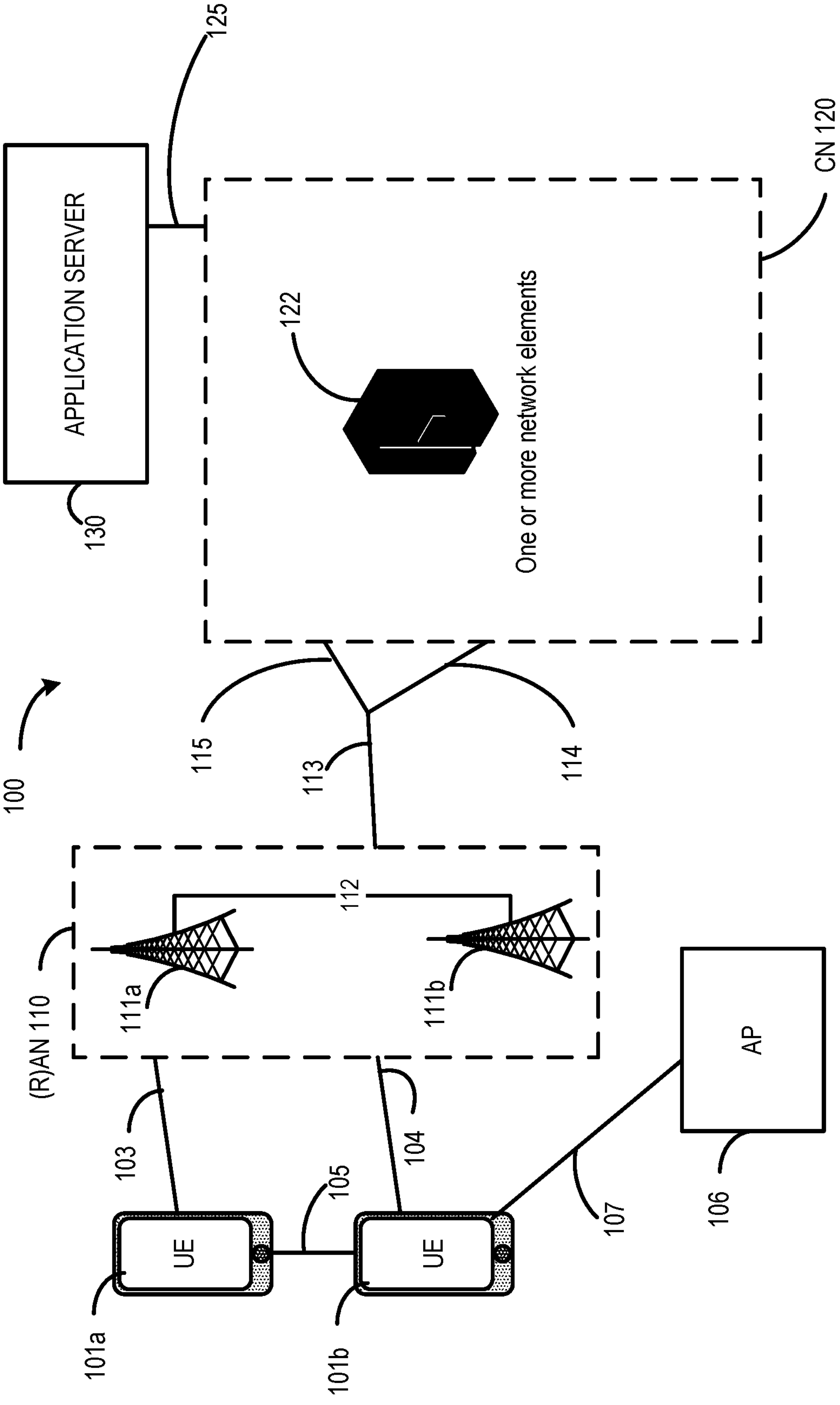
FIG. 1 illustrates an example of a wireless communication system.

FIG. 1 illustrates an example of a wireless communication system 100. For purposes of convenience and without limitation, the example system 100 is described in the context of Long Term Evolution (LTE) and Fifth Generation (5G) New Radio (NR) communication standards as defined by the Third Generation Partnership Project (3GPP) technical specifications. More specifically, the wireless communication system 100 is described in the context of a Non-Standalone (NSA) networks that incorporate both LTE and NR, for example, E-UTRA (Evolved Universal Terrestrial Radio Access)-NR Dual Connectivity (EN-DC) networks, and NE-DC networks. However, the wireless communication system 100 may also be a Standalone (SA) network that incorporates only NR. Furthermore, other types of communication standards are possible, including future 3GPP systems (e.g., Sixth Generation (6G)) systems, IEEE 802.16 protocols (e.g., WMAN, WiMAX, etc.), or the like.

As shown by FIG. 1, the system 100 includes UE 101*a* and UE 101*b* (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some examples, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 may be configured to connect, for example, communicatively couple, with RAN 110. In some examples, the RAN 110 may be an NG RAN or a 5G RAN, an E-UTRAN, or a legacy RAN, such as a UTRAN or GERAN. As used herein, the term "NG RAN" or the like may refer to a RAN 110 that operates in an NR or 5G system 100, and the term "E-UTRAN" or the like may refer to a RAN 110 that operates in an LTE or 4G system 100. The UEs 101 utilize connections (or channels) 103 and 104, respectively, each of which comprises a physical communications interface or layer (discussed in further detail below).

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, an Advanced long term evolution (LTE-A) protocol, a LTE-based access to unlicensed spectrum (LTE-U), a 5G protocol, a NR protocol, an NR-based access to unlicensed spectrum (NR-U) protocol, and/or any of the other communications protocols discussed herein. In some examples, the UEs 101 may directly exchange communication data via a ProSe interface 105. The ProSe interface 105 may alternatively be referred to as a SL interface 105 and may comprise one or more logical channels, including but not limited to a PSCCH, a PSSCH, a PSDCH, and a PSBCH.

The UE 101*b* is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various examples, the UE 101*b*, RAN 110, and AP 106 may be configured to utilize LWA operation and/or LWIP operation. The LWA operation may involve the UE 101*b* in RRC_CONNECTED being configured by a RAN node 111*a-b* to utilize radio resources of LTE and WLAN. LWIP operation may involve the UE 101*b* using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111*a* and 111*b* (collectively referred to as "RAN nodes 111" or "RAN node 111") that enable the connections 103 and 104. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 111 that operates in an NR or 5G system 100 (for example, a gNB), and the term "E-UTRAN node" or the like may refer to a RAN node 111 that operates in an LTE or 4G system 100 (e.g., an eNB). According to various examples, the RAN nodes 111 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some examples, all or parts of the RAN nodes 111 may be implemented as one or more software entities running on server computers as part of a virtual network, which may be referred to as a CRAN and/or a virtual baseband unit pool (vBBUP). In these examples, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 2), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC via an NG interface (discussed infra).

Any of the RAN nodes 111 can terminate the air interface protocol and can be the first point of contact for the UEs 101. In some examples, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In some examples, the UEs 101 can be configured to communicate using OFDM communication signals with each other or with any of the RAN nodes 111 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the examples is not limited in this respect. The OFDM signals can comprise a plurality of orthogonal subcarriers.

In some examples, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various examples, the UEs 101 and the RAN nodes 111 communicate data (for example, transmit and receive) data over a licensed medium (also referred to as the “licensed spectrum” and/or the “licensed band”) and an unlicensed shared medium (also referred to as the “unlicensed spectrum” and/or the “unlicensed band”). The licensed spectrum may include channels that operate in the frequency range of approximately 400 MHz to approximately 3.8 GHz, whereas the unlicensed spectrum may include the 5 GHz band. NR in the unlicensed spectrum may be referred to as NR-U, and LTE in an unlicensed spectrum may be referred to as LTE-U, licensed assisted access (LAA), or MulteFire.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (s); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as “LAA SCells”), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101*b* within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some examples may use concepts for resource allocation for control channel information that are an extension of the above-described concepts. For example, some examples may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN nodes 111 may be configured to communicate with one another via interface 112. In examples where the system 100 is an LTE system, the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality.

In examples where the system 100 is a 5G or NR system, the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network-in this example, core network (CN) 120. The CN 120 may comprise a plurality of network elements 122, which are configured to offer various data and telecommunications services to customers/subscribers (e.g., users of UEs 101) who are connected to the CN 120 via the RAN 110. The components of the CN 120 may be implemented in one physical node or separate physical nodes including components to read and execute instructions from a machine-readable or computer-readable medium (e.g., a non-transitory machine-readable storage medium). In some examples, NFV may be utilized to virtualize any or all of the above-described network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, the application server 130 may be an element offering applications that use IP bearer resources with the core network (e.g., UMTS PS domain, LTE PS data services, etc.). The application server 130 can also be configured to support one or more communication services (e.g., VoIP sessions, PTT sessions, group communication sessions, social networking services, etc.) for the UEs 101 via the EPC 120.

In some examples, the CN 120 may be a 5GC (referred to as "5GC 120" or the like), and the RAN 110 may be connected with the CN 120 via an NG interface 113. In some examples, the NG interface 113 may be split into two parts, an NG user plane (NG-U) interface 114, which carries traffic data between the RAN nodes 111 and a UPF, and the S1 control plane (NG-C) interface 115, which is a signaling interface between the RAN nodes 111 and AMFs.

In some examples, the CN 120 may be a 5G CN (referred to as "5GC 120" or the like), while in other examples, the CN 120 may be an EPC). Where CN 120 is an EPC (referred to as "EPC 120" or the like), the RAN 110 may be connected with the CN 120 via an S1 interface 113. In some examples, the S1 interface 113 may be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
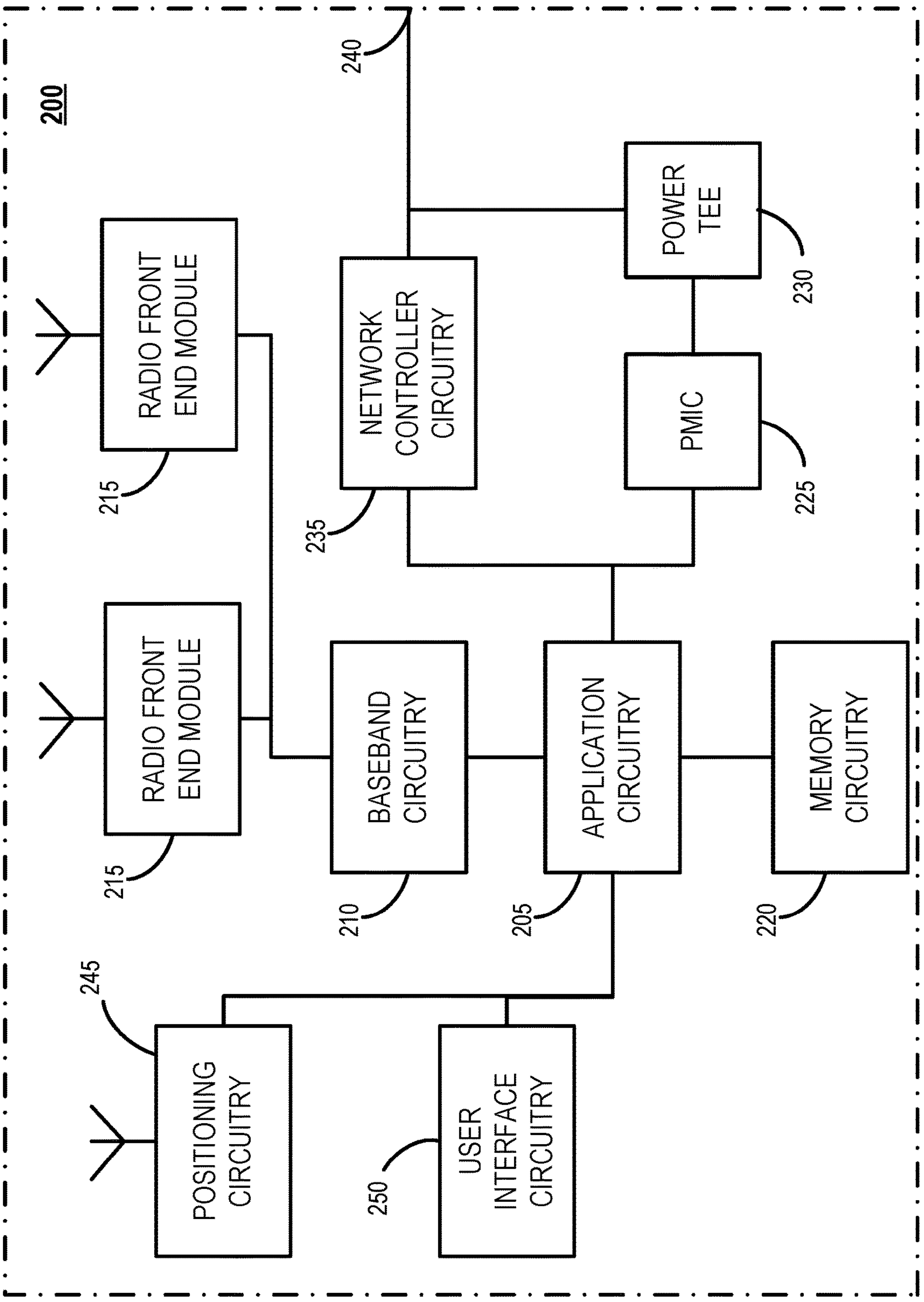
FIG. 2 illustrates an example of infrastructure equipment.

FIG. 2 illustrates an example of infrastructure equipment 200 in accordance with various examples. The infrastructure equipment 200 (or "system 200") may be implemented as a base station, radio head, RAN node such as the RAN nodes 111 and/or AP 106 shown and described previously, application server(s) 130, and/or any other element/device discussed herein. In other examples, the system 200 could be implemented in or by a UE.

The system 200 includes application circuitry 205, baseband circuitry 210, one or more radio front end modules (RFEMs) 215, memory circuitry 220, power management integrated circuitry (PMIC) 225, power tee circuitry 230, network controller circuitry 235, network interface connector 240, satellite positioning circuitry 245, and user interface 250. In some examples, the device 200 may include additional elements such as, for example, memory/storage, display, camera, sensor, or input/output (I/O) interface. In other examples, the components described below may be included in more than one device. For example, said circuitries may be separately included in more than one device for CRAN, vBBU, or other like implementations.

Application circuitry 205 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 205 may be coupled with or may include memory/storage elements and may be configured to execute instructions stored in the memory/storage to enable various applications or operating systems to run on the system 200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some examples, the application circuitry 205 may comprise, or may be, a special-purpose processor/controller to operate according to the various examples herein. As examples, the processor(s) of application circuitry 205 may include one or more Apple A-series processors, Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. Such as the ARM Cortex-A family of processors and the ThunderX2® provided by Cavium™, Inc.; a MIPS-based design from MIPS Technologies, Inc. Such as MIPS Warrior P-class processors; and/or the like. In some examples, the system 200 may not utilize application circuitry 205, and instead may include a special-purpose processor/controller to process IP data received from an EPC or 5GC, for example.

In some implementations, the application circuitry 205 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 205 may comprise logic blocks or logic fabric, and other interconnected resources that may be programmed to perform various functions, such as the procedures, methods, functions, etc. Of the various examples discussed herein. In such examples, the circuitry of application circuitry 205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up-tables (LUTs) and the like.

The baseband circuitry 210 may include circuitry and/or control logic configured to carry out various radio/network protocol and radio control functions that enable communication with one or more radio networks via the RF circuitry. In some examples, the baseband circuitry 210 may be implemented, for example, as a solder-down substrate including one or more integrated circuits, a single packaged integrated circuit soldered to a main circuit board or a multi-chip module containing two or more integrated circuits.

User interface circuitry 250 may include one or more user interfaces designed to enable user interaction with the system 200 or peripheral component interfaces designed to enable peripheral component interaction with the system 200. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 215 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 215, which incorporates both mmWave antennas and sub-mmWave.

The memory circuitry 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 220 may be implemented as one or more of solder down packaged integrated circuits, socketed memory modules and plug-in memory cards.

The PMIC 225 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 230 may provide for electrical power drawn from a network cable to provide both power supply and data connectivity to the infrastructure equipment 200 using a single cable.

The network controller circuitry 235 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 200 via network interface connector 240 using a physical connection, which may be electrical (commonly referred to as a "copper interconnect"), optical, or wireless. The network controller circuitry 235 may include one or more dedicated processors and/or FPGAs to communicate using one or more of the aforementioned protocols. In some implementations, the network controller circuitry 235 may include multiple controllers to provide connectivity to other networks using the same or different protocols.

The positioning circuitry 245 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 245 may include a Micro-Technology for Positioning, Navigation, and Timing (Micro-PNT) IC that uses a master timing clock to perform position tracking/estimation without GNSS assistance. The positioning circuitry 245 may also be part of, or interact with, the baseband circuitry 210 and/or RFEMs 215 to communicate with the nodes and components of the positioning network. The positioning circuitry 245 may also provide position data and/or time data to the application circuitry 205, which may use the data to synchronize operations with various infrastructure (e.g., RAN nodes 111, etc.), or the like.

The components shown by FIG. 2 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an 12C interface, an SPI interface, point to point interfaces, and a power bus, among others.

Figure 3:
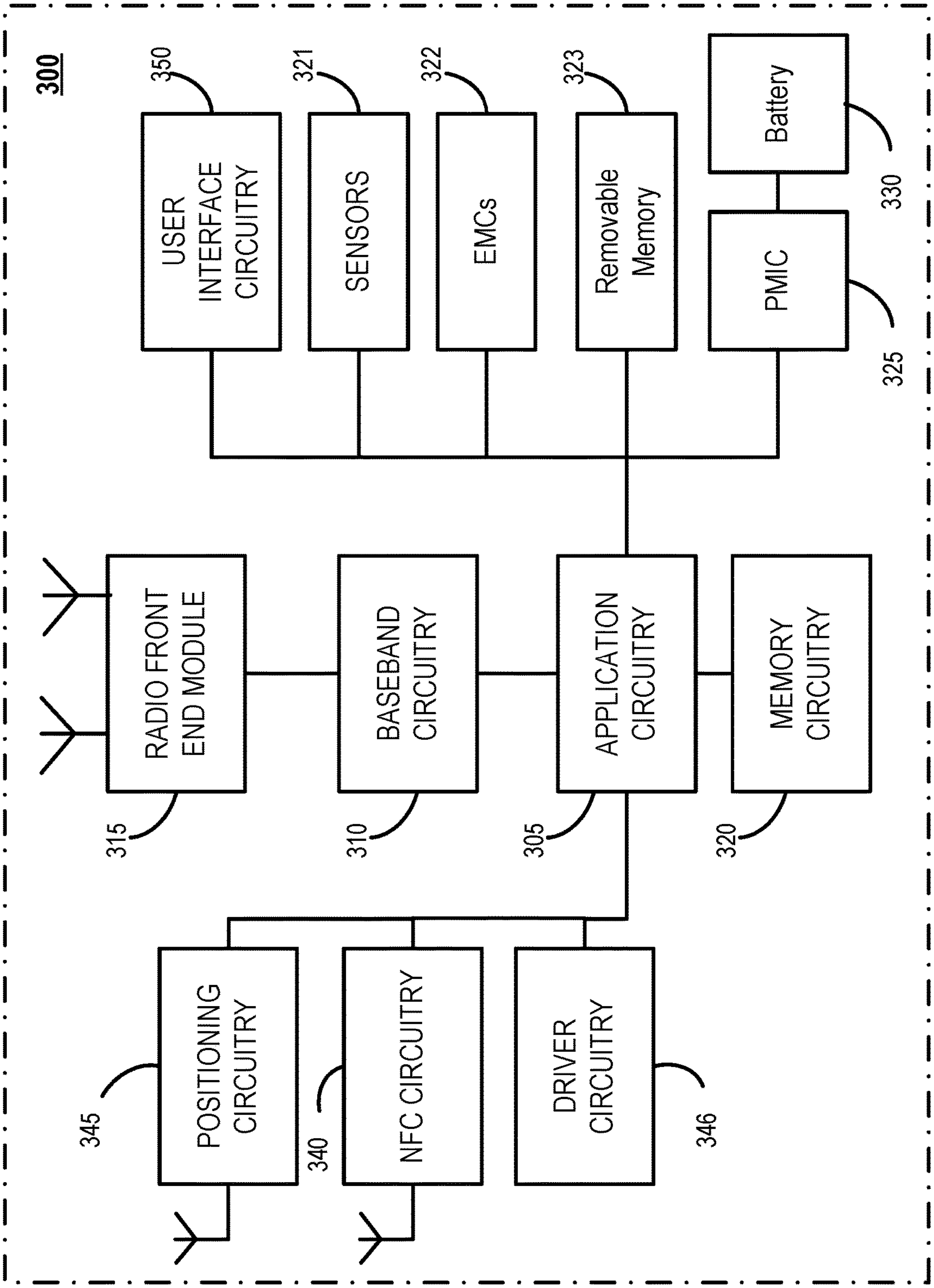
FIG. 3 illustrates an example of a device.

FIG. 3 illustrates an example of a platform 300 (or "device 300") in accordance with various examples. In some examples, the computer platform 300 may be suitable for use as UEs 101, application servers 130, and/or any other element/device discussed herein. The platform 300 may include any combinations of the components shown in the example. The components of platform 300 may be implemented as integrated circuits (ICs), portions thereof, discrete electronic devices, or other modules, logic, hardware, software, firmware, or a combination thereof adapted in the computer platform 300, or as components otherwise incorporated within a chassis of a larger system. The block diagram of FIG. 3 is intended to show a high level view of components of the computer platform 300. However, some of the components shown may be omitted, additional components may be present, and different arrangement of the components shown may occur in other implementations.

Application circuitry 305 includes circuitry such as, but not limited to one or more processors (or processor cores), cache memory, and one or more of LDOs, interrupt controllers, serial interfaces such as SPI, 12C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some examples, the application circuitry 205 may comprise, or may be, a special-purpose processor/controller to operate according to the various examples herein.

As examples, the processor(s) of application circuitry 305 may include an Apple A-series processor. The processors of the application circuitry 305 may also be one or more of an Intel® Architecture Core™ based processor, such as a Quark™, an Atom™, an i3, an i5, an i7, or an MCU-class processor, or another such processor available from Intel® Corporation, Santa Clara, Calif.; Advanced Micro Devices (AMD) Ryzen® processor(s) or Accelerated Processing Units (APUs); Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 305 may be a part of a system on a chip (SoC) in which the application circuitry 305 and other components are formed into a single integrated circuit.

Additionally or alternatively, application circuitry 305 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such examples, the circuitry of application circuitry 305 may comprise logic blocks or logic fabric, and other interconnected resources that may be programmed to perform various functions, such as the procedures, methods, functions, etc. Of the various examples discussed herein. In such examples, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. In look-up tables (LUTs) and the like.

The baseband circuitry 310 includes circuitry and/or control logic configured to carry out various radio/network protocol and radio control functions that enable communication with one or more radio networks via the RF circuitry. In some examples, the baseband circuitry 310 may be implemented, for example, as a solder-down substrate including one or more integrated circuits, a single packaged integrated circuit soldered to a main circuit board or a multi-chip module containing two or more integrated circuits.

The RFEMs 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 315, which incorporates both mmWave antennas and sub-mmWave.

The memory circuitry 320 may include any number and type of memory devices used to provide for a given amount of system memory. As examples, the memory circuitry 320 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 320 may be developed in accordance with a Joint Electron Devices Engineering Council (JEDEC) low power double data rate (LPDDR)-based design, such as LPDDR2, LPDDR3, LPDDR4, or the like. Memory circuitry 320 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 320 may be on-die memory or registers associated with the application circuitry 305. To provide for persistent storage of information such as data, applications, operating systems and so forth, memory circuitry 320 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 300 may incorporate the three-dimensional (3D) cross-point (XPOINT) memories from Intel® and Micron®.

Removable memory circuitry 323 may include devices, circuitry, enclosures/housings, ports or receptacles, etc. Used to couple portable data storage devices with the platform 300. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 300 may also include interface circuitry (not shown) that is used to connect external devices with the platform 300. The external devices connected to the platform 300 via the interface circuitry include sensor circuitry 321 and electro-mechanical components (EMCs) 322, as well as removable memory devices coupled to removable memory circuitry 323.

The sensor circuitry 321 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 322 include devices, modules, or subsystems whose purpose is to enable platform 300 to change its state, position, and/or orientation, or move or control a mechanism or (sub)system. Additionally, EMCs 322 may be configured to generate and send messages/signaling to other components of the platform 300 to indicate a current state of the EMCs 322. Examples of the EMCs 322 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In some examples, platform 300 is configured to operate one or more EMCs 322 based on one or more captured events and/or instructions or control signals received from a service provider and/or various clients.

In some implementations, the interface circuitry may connect the platform 300 with positioning circuitry 345. The positioning circuitry 345 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some examples, the positioning circuitry 345 may include a Micro-PNT IC that uses a master timing clock to perform position tracking/estimation without GNSS assistance. The positioning circuitry 345 may also be part of, or interact with, the baseband circuitry 210 and/or RFEMs 315 to communicate with the nodes and components of the positioning network. The positioning circuitry 345 may also provide position data and/or time data to the application circuitry 305, which may use the data to synchronize operations with various infrastructure (e.g., radio base stations), for turn-by-turn navigation applications, or the like In some implementations, the interface circuitry may connect the platform 300 with Near-Field Communication (NFC) circuitry 340. NFC circuitry 340 is configured to provide contactless, short-range communications based on radio frequency identification (RFID) standards, wherein magnetic field induction is used to enable communication between NFC circuitry 340 and NFC-enabled devices external to the platform 300 (e.g., an "NFC touchpoint"). NFC circuitry 340 comprises an NFC controller coupled with an antenna element and a processor coupled with the NFC controller. The NFC controller may be a chip/IC providing NFC functionalities to the NFC circuitry 340 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 340, or initiate data transfer between the NFC circuitry 340 and another active NFC device (e.g., a smartphone or an NFC-enabled POS terminal) that is proximate to the platform 300.

The driver circuitry 346 may include software and hardware elements that operate to control particular devices that are embedded in the platform 300, attached to the platform 300, or otherwise communicatively coupled with the platform 300. The driver circuitry 346 may include individual drivers allowing other components of the platform 300 to interact with or control various input/output (I/O) devices that may be present within, or connected to, the platform 300. For example, driver circuitry 346 may include a display driver to control and allow access to a display device, a touchscreen driver to control and allow access to a touchscreen interface of the platform 300, sensor drivers to obtain sensor readings of sensor circuitry 321 and control and allow access to sensor circuitry 321, EMC drivers to obtain actuator positions of the EMCs 322 and/or control and allow access to the EMCs 322, a camera driver to control and allow access to an embedded image capture device, audio drivers to control and allow access to one or more audio devices.

The power management integrated circuitry (PMIC) 325 (also referred to as "power management circuitry 325") may manage power provided to various components of the platform 300. In particular, with respect to the baseband circuitry 310, the PMIC 325 may control power-source selection, voltage scaling, battery charging, or DC-to-DC conversion. The PMIC 325 may often be included when the platform 300 is capable of being powered by a battery 330, for example, when the device is included in a UE 101.

A battery 330 may power the platform 300, although in some examples the platform 300 may be mounted deployed in a fixed location, and may have a power supply coupled to an electrical grid. The battery 330 may be a lithium ion battery, a metal-air battery, such as a zinc-air battery, an aluminum-air battery, a lithium-air battery, and the like. In some implementations, such as in V2X applications, the battery 330 may be a typical lead-acid automotive battery.

In some implementations, the battery 330 may be a "smart battery," which includes or is coupled with a Battery Management System (BMS) or battery monitoring integrated circuitry. The BMS may be included in the platform 300 to track the state of charge (SoCh) of the battery 330. The BMS may be used to monitor other parameters of the battery 330 to provide failure predictions, such as the state of health (SoH) and the state of function (SoF) of the battery 330. The BMS may communicate the information of the battery 330 to the application circuitry 305 or other components of the platform 300. The BMS may also include an analog-to-digital (ADC) convertor that allows the application circuitry 305 to directly monitor the voltage of the battery 330 or the current flow from the battery 330. The battery parameters may be used to determine actions that the platform 300 may perform, such as transmission frequency, network operation, sensing frequency, and the like.

A power block, or other power supply coupled to an electrical grid may be coupled with the BMS to charge the battery 330. In some examples, the power block XS30 may be replaced with a wireless power receiver to obtain the power wirelessly, for example, through a loop antenna in the computer platform 300. In these examples, a wireless battery charging circuit may be included in the BMS. The specific charging circuits chosen may depend on the size of the battery 330, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 350 includes various input/output (I/O) devices present within, or connected to, the platform 300, and includes one or more user interfaces designed to enable user interaction with the platform 300 and/or peripheral component interfaces designed to enable peripheral component interaction with the platform 300. The user interface circuitry 350 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 300. The output device circuitry may also include speakers or other audio emitting devices, printer(s), and/or the like. In some examples, the sensor circuitry 321 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 300 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 4:
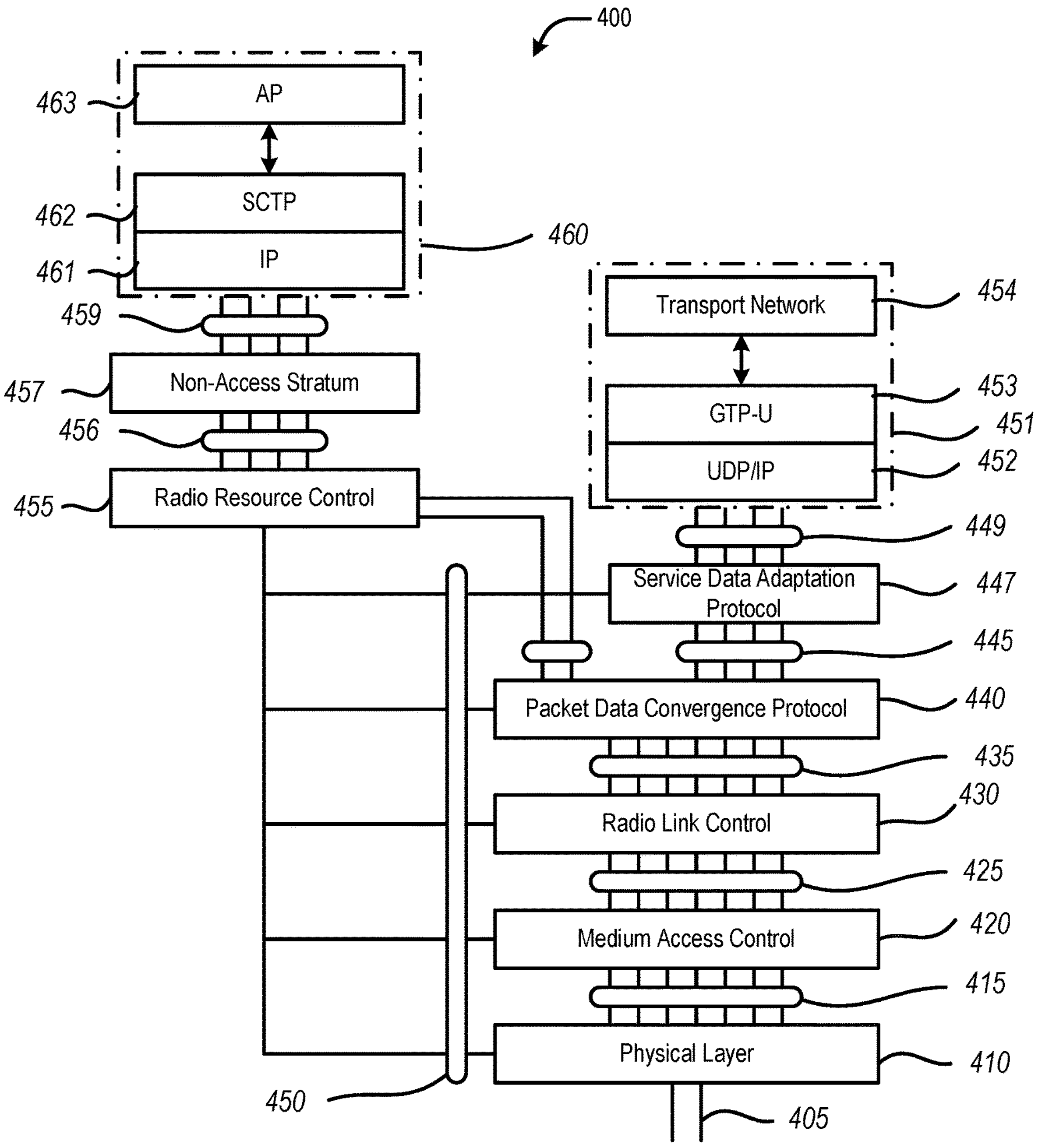
FIG. 4 illustrates various protocol functions.

FIG. 4 illustrates various protocol functions that may be implemented in a wireless communication device according to various examples. In particular, FIG. 4 includes an arrangement 400 showing interconnections between various protocol layers/entities. The following description of FIG. 4 is provided for various protocol layers/entities that operate in conjunction with the 5G/NR system standards and LTE system standards, but some or all of the aspects of FIG. 4 may be applicable to other wireless communication network systems as well.

The protocol layers of arrangement 400 may include one or more of PHY 410, MAC 420, RLC 430, PDCP 440, SDAP 447, RRC 455, and NAS layer 457, in addition to other higher layer functions not illustrated. The protocol layers may include one or more service access points (e.g., items 459, 456, 450, 449, 445, 435, 425, and 415 in FIG. 4) that may provide communication between two or more protocol layers.

The PHY 410 may transmit and receive physical layer signals 405 that may be received from or transmitted to one or more other communication devices. The physical layer signals 405 may comprise one or more physical channels, such as those discussed herein. The PHY 410 may further perform link adaptation or adaptive modulation and coding (AMC), power control, cell search (e.g., for initial synchronization and handover purposes), and other measurements used by higher layers, such as the RRC 455. The PHY 410 may still further perform error detection on the transport channels, forward error correction (FEC) coding/decoding of the transport channels, modulation/demodulation of physical channels, interleaving, rate matching, mapping onto physical channels, and MIMO antenna processing. In some examples, an instance of PHY 410 may process requests from and provide indications to an instance of MAC 420 via one or more PHY-SAP 415. According to some examples, requests and indications communicated via PHY-SAP 415 may comprise one or more transport channels.

Instance(s) of MAC 420 may process requests from, and provide indications to, an instance of RLC 430 via one or more MAC-SAPs 425. These requests and indications communicated via the MAC-SAP 425 may comprise one or more logical channels. The MAC 420 may perform mapping between the logical channels and transport channels, multiplexing of MAC SDUs from one or more logical channels onto TBs to be delivered to PHY 410 via the transport channels, de-multiplexing MAC SDUs to one or more logical channels from TBs delivered from the PHY 410 via transport channels, multiplexing MAC SDUs onto TBs, scheduling information reporting, error correction through HARQ, and logical channel prioritization.

Instance(s) of RLC 430 may process requests from and provide indications to an instance of PDCP 440 via one or more radio link control service access points (RLC-SAP) 435. These requests and indications communicated via RLC-SAP 435 may comprise one or more RLC channels. The RLC 430 may operate in a plurality of modes of operation, including: Transparent Mode (TM), Unacknowledged Mode (UM), and Acknowledged Mode (AM). The RLC 430 may execute transfer of upper layer protocol data units (PDUs), error correction through automatic repeat request (ARQ) for AM data transfers, and concatenation, segmentation and reassembly of RLC SDUs for UM and AM data transfers. The RLC 430 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 440 may process requests from and provide indications to instance(s) of RRC 455 and/or instance(s) of SDAP 447 via one or more packet data convergence protocol service access points (PDCP-SAP) 445. These requests and indications communicated via PDCP-SAP 445 may comprise one or more radio bearers. The PDCP 440 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 447 may process requests from and provide indications to one or more higher layer protocol entities via one or more SDAP-SAP 449. These requests and indications communicated via SDAP-SAP 449 may comprise one or more QoS flows. The SDAP 447 may map QoS flows to DRBs, and vice versa, and may also mark QFIs in DL and UL packets. A single SDAP entity 447 may be configured for an individual PDU session. In the UL direction, the NG-RAN 110 may control the mapping of QoS Flows to DRB(s) in two different ways, reflective mapping or explicit mapping. For reflective mapping, the SDAP 447 of a UE 101 may monitor the QFIs of the DL packets for each DRB, and may apply the same mapping for packets flowing in the UL direction. For a DRB, the SDAP 447 of the UE 101 may map the UL packets belonging to the QoS flows(s) corresponding to the QoS flow ID(s) and PDU session observed in the DL packets for that DRB. To enable reflective mapping, the NG-RAN may mark DL packets over the Uu interface with a QoS flow ID. The explicit mapping may involve the RRC 455 configuring the SDAP 447 with an explicit QoS flow to DRB mapping rule, which may be stored and followed by the SDAP 447. In some examples, the SDAP 447 may only be used in NR implementations and may not be used in LTE implementations.

The RRC 455 may configure, via one or more management service access points (M-SAP), aspects of one or more protocol layers, which may include one or more instances of PHY 410, MAC 420, RLC 430, PDCP 440 and SDAP 447. In some examples, an instance of RRC 455 may process requests from and provide indications to one or more NAS entities 457 via one or more RRC-SAPs 456. The main services and functions of the RRC 455 may include broadcast of system information (e.g., included in MIBs or SIBs related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBs may comprise one or more IEs, which may each comprise individual data fields or data structures.

The NAS 457 may form the highest stratum of the control plane between the UE 101 and the AMF. The NAS 457 may support the mobility of the UEs 101 and the session management procedures to establish and maintain IP connectivity between the UE 101 and a P-GW in LTE systems.

According to various examples, one or more protocol entities of arrangement 400 may be implemented in UEs 101, RAN nodes 111, AMF (e.g., in NR implementations) or MME (e.g., in LTE implementations), UPF (e.g., in NR implementations) or S-GW and P-GW (e.g., in LTE implementations), or the like to be used for control plane or user plane communications protocol stack between the aforementioned devices. In such examples, one or more protocol entities that may be implemented in one or more of UE 101, gNB 111, AMF, etc. May communicate with a respective peer protocol entity that may be implemented in or on another device using the services of respective lower layer protocol entities to perform such communication. In some examples, a gNB-CU of the gNB 111 may host the RRC 455, SDAP 447, and PDCP 440 of the gNB that controls the operation of one or more gNB-DUs, and the gNB-DUs of the gNB 111 may each host the RLC 430, MAC 420, and PHY 410 of the gNB 111.

In a first example, a control plane protocol stack may comprise, in order from highest layer to lowest layer, NAS 457, RRC 455, PDCP 440, RLC 430, MAC 420, and PHY 410. In this example, upper layers 460 may be built on top of the NAS 457, which includes an IP layer 461, an SCTP 462, and an application layer signaling protocol (AP) 463.

In NR implementations, the AP 463 may be an NG application protocol layer (NGAP or NG-AP) 463 for the NG interface 113 defined between the NG-RAN node 111 and the AMF, or the AP 463 may be an Xn application protocol layer (XnAP or Xn-AP) 463 for the Xn interface 112 that is defined between two or more RAN nodes 111.

The NG-AP 463 may support the functions of the NG interface 113 and may comprise Elementary Procedures (EPs). An NG-AP EP may be a unit of interaction between the NG-RAN node 111 and the AMF. The NG-AP 463 services may comprise two groups: UE-associated services (e.g., services related to a UE 101) and non-UE-associated services (e.g., services related to the whole NG interface instance between the NG-RAN node 111 and AMF). These services may include functions including, but not limited to: a paging function for the sending of paging requests to NG-RAN nodes 111 involved in a particular paging area; a UE context management function for allowing the AMF to establish, modify, and/or release a UE context in the AMF and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF; a NAS node selection function for determining an association between the AMF and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement (PM) data, etc.) between two RAN nodes 111 via CN 120; and/or other like functions.

The XnAP 463 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 463 may be an S1 Application Protocol layer (S1-AP) 463 for the S1 interface 113 defined between an E-UTRAN node 111 and an MME, or the AP 463 may be an X2 application protocol layer (X2AP or X2-AP) 463 for the X2 interface 112 that is defined between two or more E-UTRAN nodes 111.

The S1 Application Protocol layer (S1-AP) 463 may support the functions of the S1 interface, and similar to the NG-AP discussed previously, the S1-AP may comprise S1-AP EPs. An S1-AP EP may be a unit of interaction between the E-UTRAN node 111 and an MME within an LTE CN 120. The S1-AP 463 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 463 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 462 may provide guaranteed delivery of application layer messages (e.g., NGAP or XnAP messages in NR implementations, or S1-AP or X2AP messages in LTE implementations). The SCTP 462 may ensure reliable delivery of signaling messages between the RAN node 111 and the AMF/MME based, in part, on the IP protocol, supported by the IP 461. The Internet Protocol layer (IP) 461 may be used to perform packet addressing and routing functionality. In some implementations the IP layer 461 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 447, PDCP 440, RLC 430, MAC 420, and PHY 410. The user plane protocol stack may be used for communication between the UE 101, the RAN node 111, and UPF in NR implementations or an S-GW and P-GW in LTE implementations. In this example, upper layers 451 may be built on top of the SDAP 447, and may include a user datagram protocol (UDP) and IP security layer (UDP/IP) 452, a General Packet Radio Service (GPRS) Tunneling Protocol for the user plane layer (GTP-U) 453, and a User Plane PDU layer (UP PDU) 463.

The transport network layer 454 (also referred to as a "transport layer") may be built on IP transport, and the GTP-U 453 may be used on top of the UDP/IP layer 452 (comprising a UDP layer and IP layer) to carry user plane PDUs (UP-PDUs). The IP layer (also referred to as the "Internet layer") may be used to perform packet addressing and routing functionality. The IP layer may assign IP addresses to user data packets in any of IPv4, IPv6, or PPP formats, for example.

The GTP-U 453 may be used for carrying user data within the GPRS core network and between the radio access network and the core network. The user data transported can be packets in any of IPv4, IPv6, or PPP formats, for example. The UDP/IP 452 may provide checksums for data integrity, port numbers for addressing different functions at the source and destination, and encryption and authentication on the selected data flows. The RAN node 111 and the S-GW may utilize an S1-U interface to exchange user plane data via a protocol stack comprising an L1 layer (e.g., PHY 410), an L2 layer (e.g., MAC 420, RLC 430, PDCP 440, and/or SDAP 447), the UDP/IP layer 452, and the GTP-U 453. The S-GW and the P-GW may utilize an S5/S8a interface to exchange user plane data via a protocol stack comprising an L1 layer, an L2 layer, the UDP/IP layer 452, and the GTP-U 453. As discussed previously, NAS protocols may support the mobility of the UE 101 and the session management procedures to establish and maintain IP connectivity between the UE 101 and the P-GW.

Moreover, although not shown by FIG. 4, an application layer may be present above the AP 463 and/or the transport network layer 454. The application layer may be a layer in which a user of the UE 101, RAN node 111, or other network element interacts with software applications being executed, for example, by application circuitry 205 or application circuitry 305, respectively. The application layer may also provide one or more interfaces for software applications to interact with communications systems of the UE 101 or RAN node 111, such as the baseband circuitry 210, 310. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

In some examples, a UE (e.g., UE 101 or device 300) can employ one or more communication protocols configured to reduce power consumption. For example, if the UE is in an RRC_Connected state, in which it is still connected to the network as it expects to receive traffic shortly, then it may enter a state known as Discontinuous Reception (DRX) (sometimes referred to as Connected Mode DRX or CDRX) after a period of inactivity. During this state, the UE may alternate between a low-power sleep mode in which one or more components or functions of the UE are powered down to reduce power consumption, and an awake mode in which UE power consumption is increased relative to the sleep mode to enable the UE to transmit and receive data, among other functions. If there is no data traffic activity for an extended period of time, then the UE may transition to an RRC_Idle state, where it disconnects from the network and does not perform operations such as channel quality feedback or handover to further reduce power consumption. In some examples, the UE may not receive data in the RRC_Idle state; in order to receive data, it must transition back to RRC_Connected state.

Figure 5:
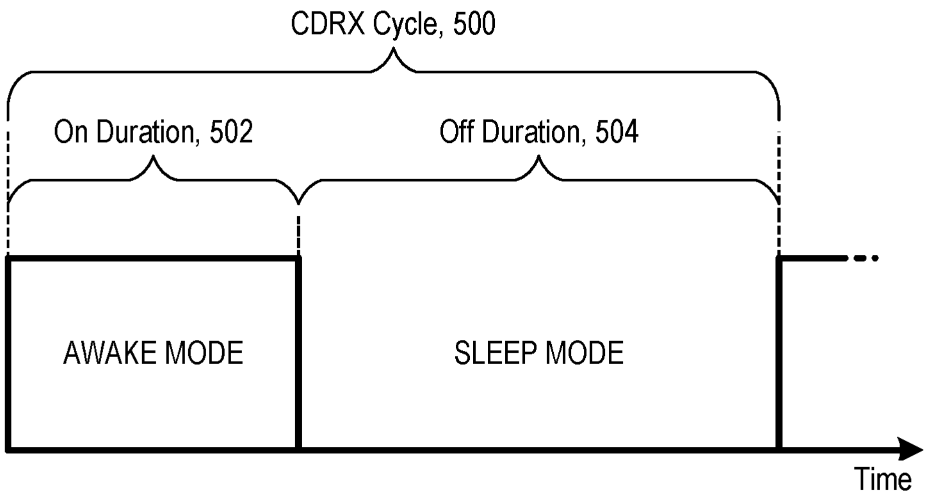
FIG. 5 illustrates an example Connected-Mode Discontinuous Reception (CDRX) communication cycle.

FIG. 5 illustrates an example CDRX communication cycle 500. In this example, the CDRX cycle 500 may correspond to an instance of voice or other discontinuous communications between a UE (e.g., UE 101 or device 300) and, for example, a RAN node (e.g., RAN node 111 or system 200). As shown in FIG. 5, the CDRX cycle 500 includes an on duration 502 that corresponds to a time period allocated for the UE to operate in an awake mode, and an off duration 504 that corresponds to a time period allocated for the UE to operate in a sleep mode. During the awake mode, the UE monitors one or more downlink communication channels (e.g., PDCCH) for downlink information from the RAN node, such as an uplink grant or other information. The UE can also be configured to transmit uplink information, such as a scheduling request (SR) or uplink data, to the RAN node during the awake mode. During the sleep mode, the UE need not monitor for downlink communications from the RAN node, as the RAN node is aware of the CDRX cycle 500 and will not schedule downlink transmissions to the UE during the off duration 504. Therefore, the UE can power down some of its components, such as its receiver components, while in the sleep mode to reduce power consumption.

In some examples, the UE is configured to enter the sleep mode when a pause in communications extends beyond a duration of an inactivity timer. For example, when the UE is in the connected state and a time between the arrival of data (e.g., voice packets) is longer than the inactivity timer (e.g., the inactivity timer expires between voice activity), then the UE transitions into the sleep mode. In some examples, a start of the inactivity timer may coincide with an end of data reception. The end of the inactivity timer may coincide with a start of the sleep mode (or an end to the awake mode) provided there is no intervening data received prior to the expiration of the inactivity timer. When there is an intervening data reception, the inactivity timer is reset. The duration of the inactivity timer (as well as the corresponding CDRX on duration 502 and the CDRX off duration 504, among others) can be defined by the network according to, for example, 3GPP TS 36.321, TS 38.321, and other related technical specifications.

At times, the UE may prematurely wake up from the sleep mode in order to communicate with the RAN node. For example, during voice communications (e.g., voice over LTE (VoLTE) or voice over NR (VoNR)), a voice packet may be output every 20 ms by higher layers of the UE for uplink transmission. Upon receipt of a voice packet (e.g., at an uplink buffer of the UE), the UE may request an uplink grant by transmitting a SR to the RAN node during the next SR occasion. Since the SR occasion is set by the network and dynamically changes based on, for example, network load, the SR occasion may occur while the UE is in the sleep mode. As a result, the UE may wake up before the scheduled end of the sleep mode (e.g., during the CDRX off duration 504) to send the SR, thereby increasing power consumption.

Figure 6A:
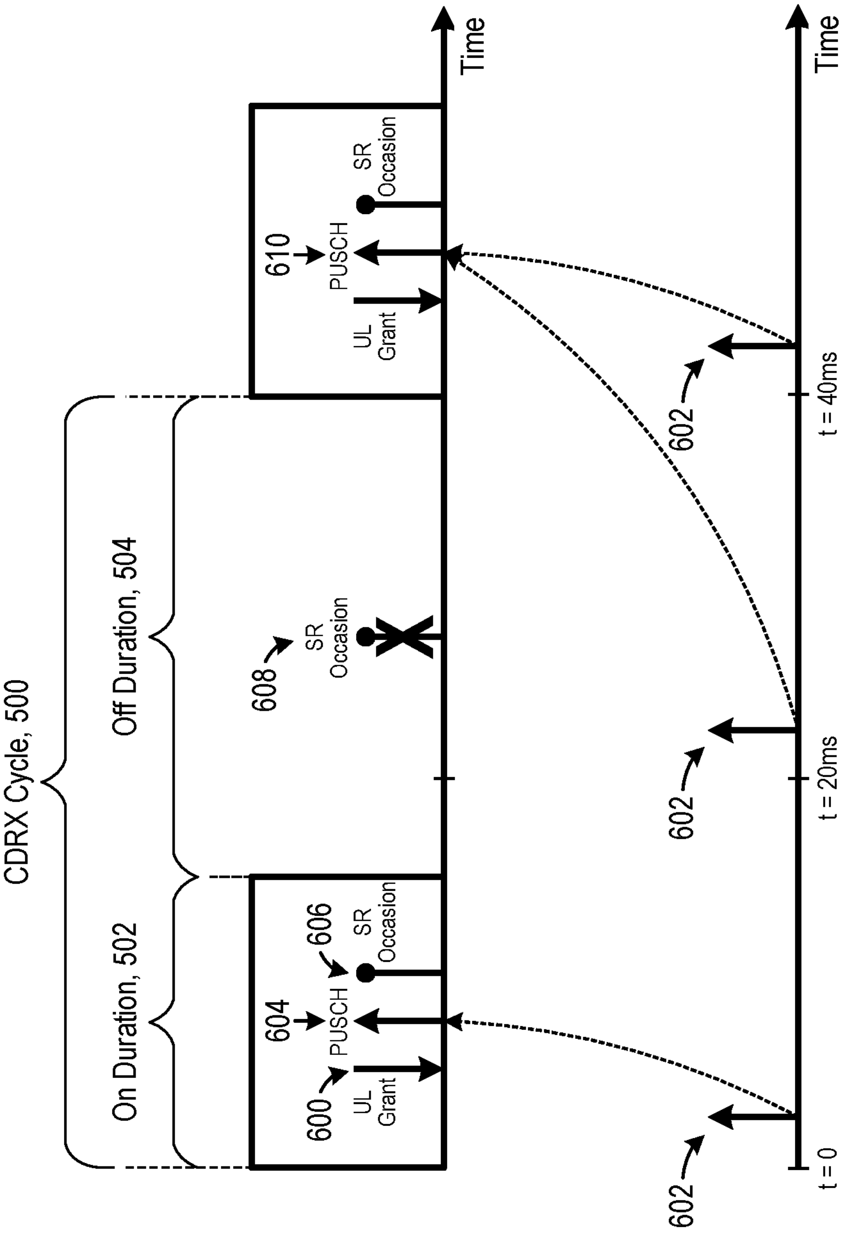
FIGS. 6A and 6B illustrate examples of scheduling request (SR) suppression during CDRX communications.

One approach for preventing a UE from waking up prematurely is to suppress the transmission of SR during the off duration of the CDRX cycle. For instance, FIG. 6A illustrates an example of physical layer SR suppression when the network pre-schedules uplink transmissions via an uplink grant 600 within the on duration 502 of the CDRX cycle 500. In this example, the network has configured the UE with a 40 ms CDRX cycle 500, and uplink data packets 602 (e.g., voice data packets) arrive at L2 of the UE every 20 ms. As shown in FIG. 6A, the first uplink data packet 602 arrives shortly before the uplink grant 600, and therefore can be included in a PUSCH transmission 604 to the network (e.g., RAN node) within the on duration 502 of the first CDRX cycle 500. Since there are no further uplink data packets 602 in the buffer at the time of the SR occasion 606, the UE does not transmit a SR.

The next data packet 602 arrives during the off duration 504 of the CDRX cycle 500 while the UE is in the sleep mode. Under normal operation (e.g., according to the 3GPP technical specifications), the UE would wake up from the sleep mode during the next SR occasion 608 in order to facilitate transmission of the queued data packet 602. However, in this example, the UE has learned or otherwise knows that pre-scheduling is enabled during the on duration 502 of the CDRX cycle 500. Accordingly, the UE can suppress (e.g., avoid acting on) the SR occasion 608 and instead transmit the data packet 602 (along with any intervening data packets) in a PUSCH transmission 610 during the on duration of the next CDRX cycle. In this manner, the UE avoids waking up during the scheduled sleep period, thereby reducing power consumption at the expense of a minor latency increase, which is deemed acceptable.

Figure 6B:
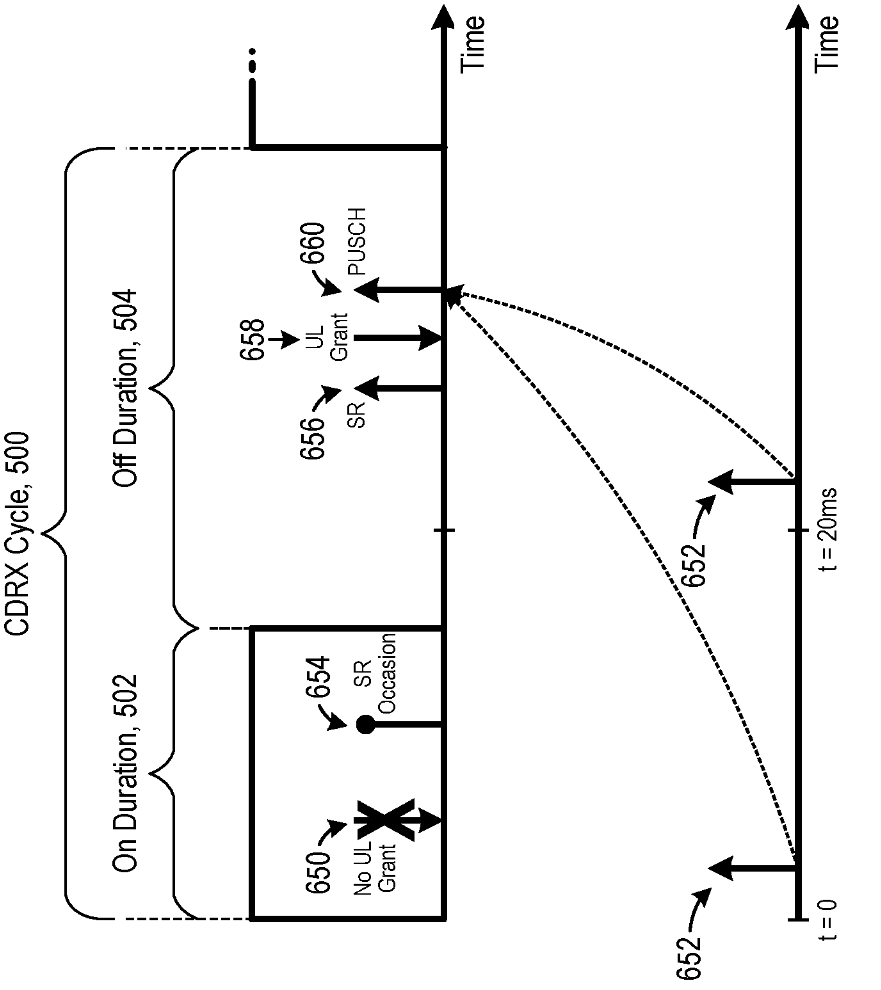

FIG. 6B illustrates an example of physical layer SR suppression when the network does not pre-schedule uplink transmissions. In this example, the first uplink data packet 652 arrives during the on duration 502 of the CDRX cycle 500 while the UE is awake. However, the network has not issued an uplink grant 650, as indicated by the 'X' through the uplink grant. In addition, the UE does not know to act on the SR occasion 652 in this example (e.g., because the UE has not learned the network's grant pattern, the UE has made an error in its prediction of the network's grant pattern, etc.). Thus, the UE does not transmit the uplink data packet 652 during the on duration of the CDRX cycle 500. The next data packet 652 arrives while the UE is in the sleep mode. Accordingly, the UE wakes up from the sleep mode to transmit a SR 656, receive an uplink grant 658, and send a PUSCH transmission 660 with the data packets currently in the buffer. As a result of this additional wake-up period, power consumption is increased at the UE. In addition, while the techniques described with reference to FIGS. 6A and 6B can reduce power consumption, they cause the UE to employ complicated solutions to self-learn the network grant pattern in order to determine SR suppression, to smartly select SR if pre-scheduling is unavailable, and to consider HARQ timeline, among other things.

Figure 7:
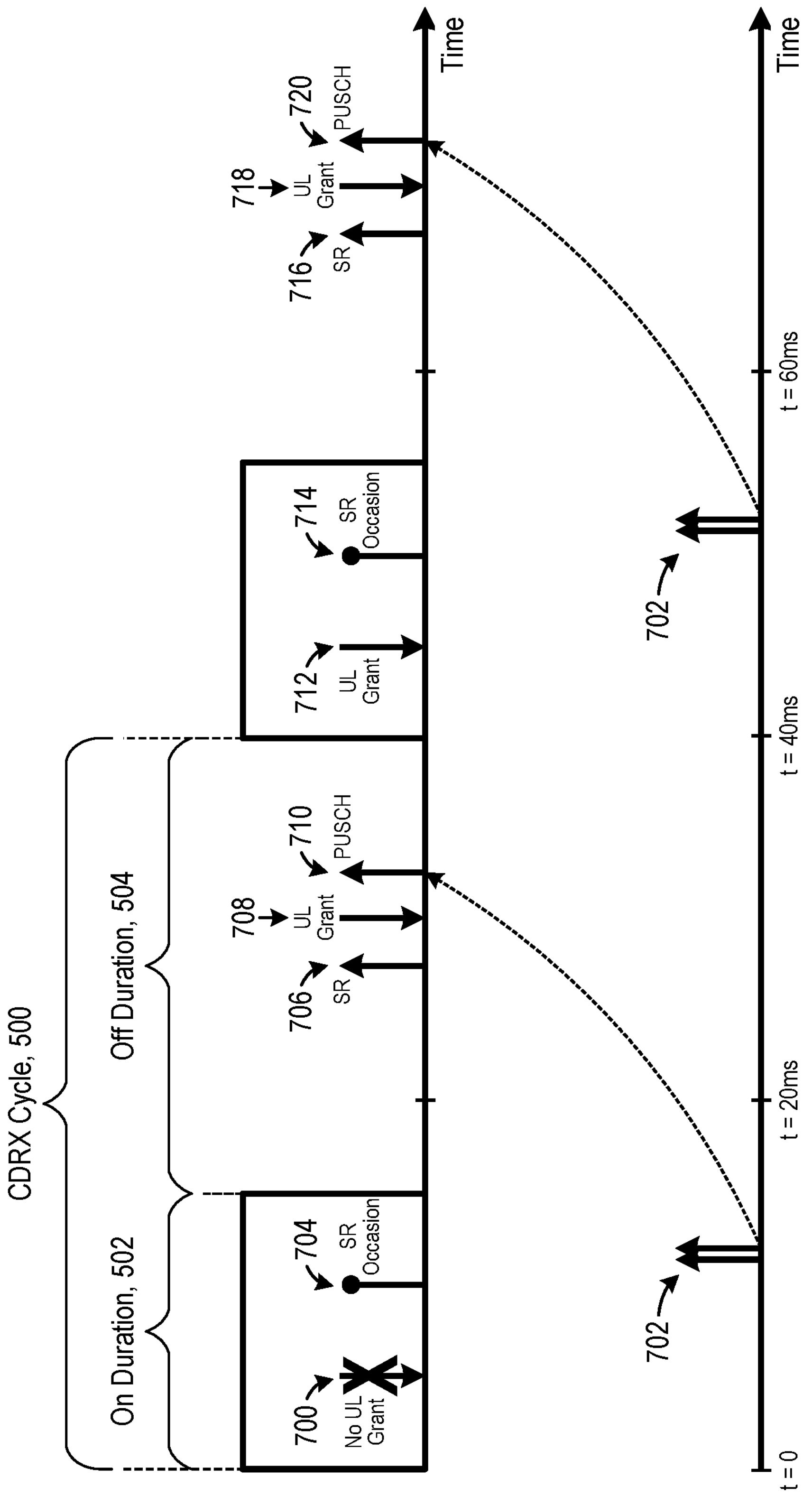
FIG. 7 illustrates bundling of data packets during CDRX communications.

Another approach for reducing the number of premature wake-ups by the UE is data buffering. Under this approach, data packets are buffered and bundled together to reduce the number of uplink transmissions by the UE, as shown in FIG. 7. In this example, the network has configured the UE with a 40 ms CDRX cycle 500, and a pair of bundled uplink data packets 702 (e.g., bundled voice data packets) arrive at L2 of the UE every 40 ms. As shown in FIG. 7, the first pair of bundled data packets 702 arrive during the on duration 502 of the CDRX cycle 500 while the UE is awake. However, the network has not pre-scheduled an uplink grant 700, and the pair of bundled packets 702 arrive after the SR occasion 704. Thus, in this example, the UE cannot transmit the bundled packets 702 during the on duration 502 of the CDRX cycle 500. Instead, the UE wakes up during the off duration 504 allocated for sleep in order to transmit a SR 706, receive an uplink grant 708, and send a PUSCH transmission 710 with the bundled data packets 702. In the next CDRX cycle, the network pre-schedules an uplink grant 712 during the awake period. However, the next pair of bundled packets 702 does not arrive until after the uplink grant 712 (as well as the subsequent SR occasion 714), which causes the UE to once again wake up during the sleep period to transmit a SR 716, receive an uplink grant 718, and send a PUSCH transmission 720 with the bundled data packets 702. Thus, while data buffering can theoretically reduce power consumption at the UE, the example shown in FIG. 7 illustrates that, without more, data buffering can cause additional wake up periods, unnecessary SR transmissions, and a waste of pre-scheduled uplink grants.

The technology described here uses adaptive SR delay and packet bundling techniques to reduce power consumption at a UE during CDRX operation. In particular, a SR can be adaptively delayed to allow the UE to observe whether the network has enabled uplink pre-scheduling during the on duration of the CDRX cycle before transmission. By doing so, the UE can make an informed decision to not trigger the SR if uplink pre-scheduling is enabled during the on duration of the CDRX cycle, or to trigger the SR with low power consumption (e.g., without an additional wake-up period) if network pre-scheduling is disabled. In some examples, adaptive packet bundling techniques are used to further reduce power consumption and/or latency.

Figure 8A:
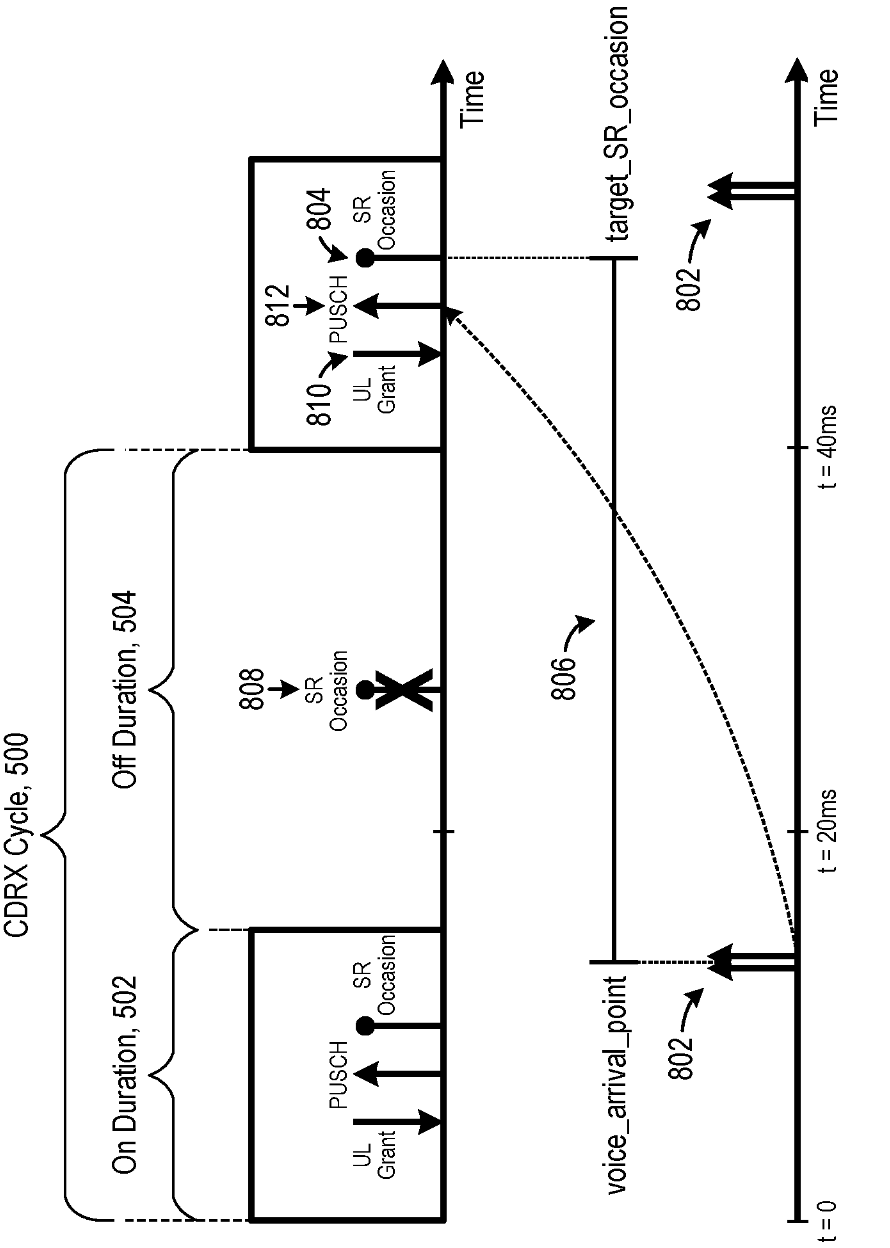
FIGS. 8A and 8B illustrate examples of adaptive SR delay during CDRX communications.
Figure 8B:
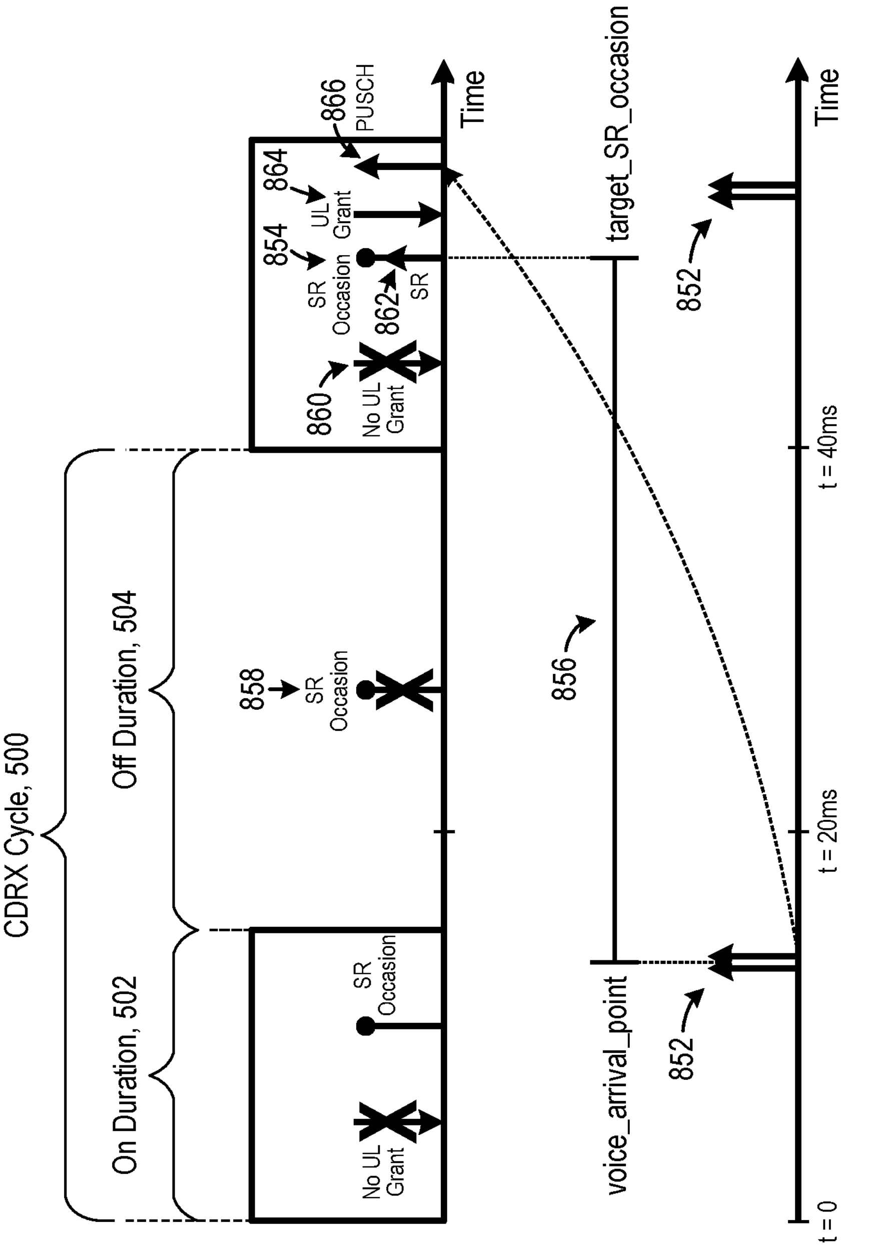

FIGS. 8A and 8B illustrate examples of adaptive SR delay in accordance with an aspect of the present disclosure. Referring to FIG. 8A, an example of adaptive SR delay in the case where pre-scheduling is enabled is shown. In this example, a pair of bundled packets 802 (e.g., bundled voice packets) are received by an uplink buffer of the UE, although the packets need not be bundled in some examples. Upon receipt of the packets 802, the UE identifies a target SR occasion 804 occurring after the arrival of the packets 802 and within the on duration of a CDRX cycle. The UE then determines a time 806 between the arrival of the packets 802 and the target SR occasion 804 (e.g., $t_{target\_SR\_occasion}-t_{voice\_arrival\_point}$). From here, the UE sets a SR-DelayTimer to the determined time 806 between the arrival of the packets 802 and the target SR occasion 804 (e.g., SR-DelayTimer=$t_{target\_SR\_occasion}-t_{voice\_arrival\_point}$). The SR-DelayTimer is configured to start at the arrival point of the packets 802 and run for the determined time 806. While the SR-DelayTimer is active, the UE may not trigger a SR (e.g., at the SR occasion 808).

Since pre-scheduling is enabled in this example, an uplink grant 810 may be received during the on duration of the CDRX cycle while the SR-DelayTimer is active, which can be observed by the UE. As a result, the UE may not trigger a SR when the SR-DelayTimer expires, as the UE has observed that pre-scheduling is enabled and that an uplink grant 810 has been received. Rather, the UE can use the resources allocated in the uplink grant 810 to send a PUSCH transmission 812 with the packets 802.

FIG. 8B illustrates an example of adaptive SR delay in the case where pre-scheduling is disabled. In this example, a pair of bundled packets 852 are received by an uplink buffer of the UE. Upon receipt of the packets 852, the UE identifies a target SR occasion 854 occurring after the arrival of the packets 852 and within the on duration of a CDRX cycle. The UE determines a time 856 between the arrival of the packets 852 and the target SR occasion 854 and sets a SR-DelayTimer to the determined time 856. As with the example discussed with reference to FIG. 8A, the UE may not trigger a SR (e.g., at the SR occasion 858) while the SR-DelayTimer is active. Since pre-scheduling is disabled in this example, a pre-scheduled uplink grant 860 may not be received during the on duration of the CDRX cycle while the SR-DelayTimer is active, which can be observed by the UE. As a result, the UE may trigger a SR 862 at the SR occasion

854 when the SR-DelayTimer expires. The UE can then use the resources allocated in the subsequent uplink grant 864 to send a PUSCH transmission 862 with the packets 866.

Figure 9:
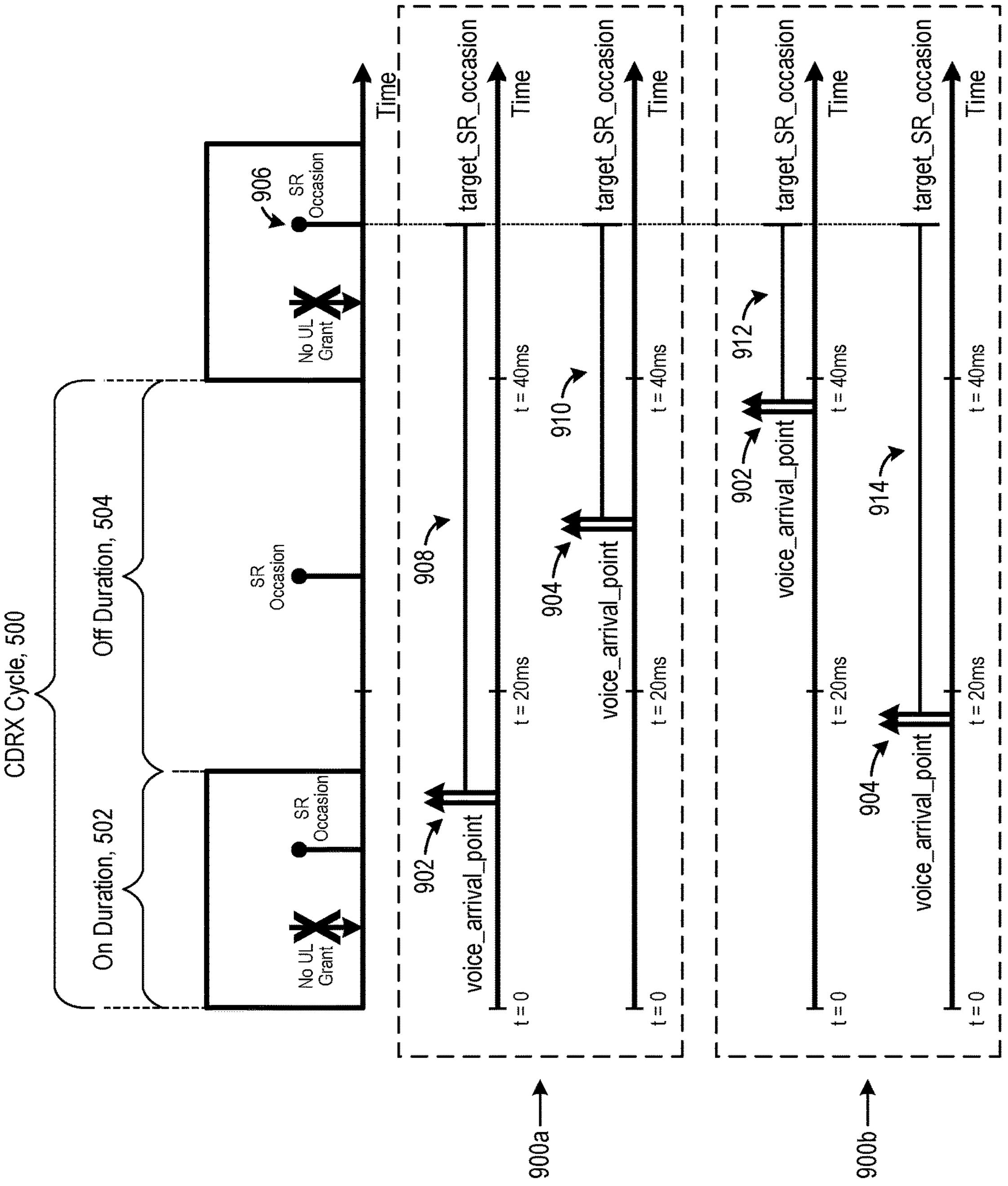
FIG. 9 illustrates an example of adaptive packet bundling pattern selection during CDRX communications.

FIG. 9 illustrates examples of adaptive packet bundling pattern selection in accordance with an aspect of the present disclosure. In general, packets can be bundled according to a variety of different patterns depending on the number of packets being bundled. For example, when bundling two packets, an earlier packet can be bundled to a later packet to produce a bundling point at the later packet (e.g., <2n, 2n+1>), or a later packet can be bundled to an earlier packet to produce a bundling point at the earlier packet (e.g., <2n−1, 2n>). To reduce latency, it may be preferable to select a bundling pattern that produces a packet bundling point closest to a target SR occasion.

For example, FIG. 9 shows a first scenario 900*a* and a second scenario 900*b* in which a pair of packets 902 (e.g., voice packets) are bundled according to a first bundling pattern and a pair of packets 904 are bundled according to a second, different bundling pattern. To identify the latency induced by each pattern, the UE can determine a time between the bundling point for a respective pattern and a target SR occasion 906. The UE can then compare the determined times and select the bundling pattern that produces the smallest time interval, as such a pattern will result in the lowest latency. For example, in the first scenario 900*a*, the UE determines that a time 910 between the bundling point for the packets 904 and the target SR occasion 906 is less than a time 908 between the bundling point for the packets 902 and the target SR occasion 906. Accordingly, the UE can select the second bundling pattern as the preferred (e.g., lowest latency) bundling pattern for the first scenario 900*a*. On the other hand, for the second scenario 900*b*, a time 912 between the bundling point for the packets 902 and the target SR occasion 906 is less than a time 914 between the bundling point for the packets 904 and the target SR occasion 906. Thus, the UE can select the first bundling pattern as the preferred bundling pattern for the second scenario 900*b*.

In some instances, it may be beneficial to increase latency in order to reduce power consumption (or vice versa). Such a scenario may arise where a user places a high priority on power savings and is willing to endure a lower mean opinion score (MOS) quality with higher latency, or where a UE cannot support transmissions below a threshold latency due to transmitter resource limitations (e.g., in multi-subscriber identification module (SIM) implementations), among others. Accordingly, in some examples, a UE can buffer and adaptively bundle every N uplink data packets (e.g., uplink voice packets) in order to achieve a desired balance between power savings and latency. In some examples, the UE can determine a value for N based on an indication received from a higher layer (e.g., the application layer). For example, a higher layer could increase (or decrease) the value of N based on the battery power remaining on the UE. As another example, a higher layer could set the value of N for different bands or band combinations of multi-SIM. For example, if a dual SIM dual active (DSDA) band combination fully supports concurrent transmissions on two transmitters, then N could be set to 1 (e.g., no packet bundling, resulting in one voice packet every 20 ms) or 2 (e.g., two packets bundled together, resulting in two bundled voice packets every 40 ms). If a DSDA band combination supports one transmitter, then N could be set to 3 (e.g., three packets bundled together, resulting in three bundled voice packets every 60 ms) or 4 (e.g., four packets bundled together, resulting in four bundled voice packets every 80 ms). Other values for N and scenarios for adapting the value of N are also within the scope of the present disclosure.

Although some of the techniques described herein are discussed using separate examples or illustrative embodiments, in some examples one or more of the techniques can be combined. For instance, in some examples the techniques for adaptive SR delay discussed with reference to FIGS. 8A and 8B can be combined with the adaptive packet bundling techniques and/or the adaptive packet bundling pattern selection techniques, among others. Similarly, the techniques for adaptive packet bundling pattern selection discussed with reference to FIG. 9 can be combined with the adaptive SR delay techniques and/or the adaptive packet bundling techniques, among others.

Figure 10:
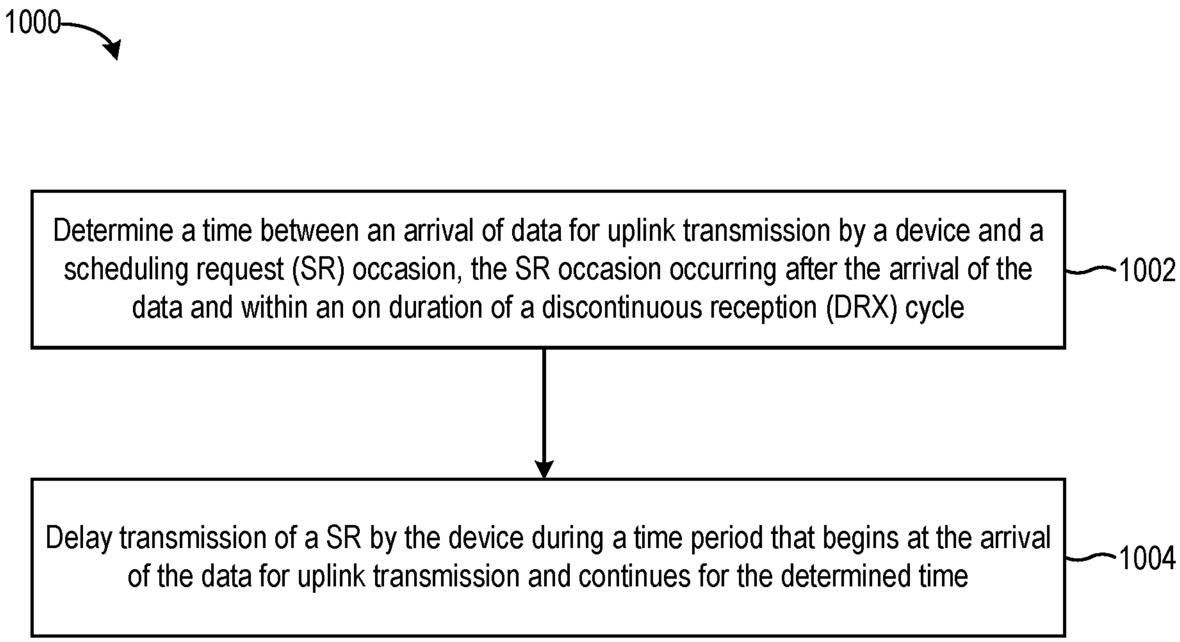
FIGS. 10, 11, and 12 illustrate example processes for low power data communications.

FIG. 10 illustrates an example process 1000 for low power data communications in accordance with an aspect of the present disclosure. In some examples, the process 1000 is performed by one or more of the devices or systems described herein, such as the UE 101 or the RAN node 111 or components thereof.

Operations of the process 1000 include determining (1002) a time between an arrival of data (e.g., voice data packets) for uplink transmission by a device and a SR occasion. The SR occasion can be one occurring after the arrival of the data for uplink transmission and within an on duration of a DRX cycle, such as the SR occasion 804 shown in FIG. 8A.

After the time between the arrival of the data and the SR occasion is determined, transmission of a SR by the device can be delayed (1004) during a time period that begins at the arrival of the data and continues for the determined time. For example, a timer can be set (e.g., by the device or otherwise) for the determined time upon reception of the data for uplink transmission, and the device can be configured to delay transmission of the SR while the timer is active.

In some examples, an absence of an uplink grant during the time period can be detected, and the SR can be transmitted after the time period in response to the absence of the uplink grant. In cases where an uplink grant is detected during the time period, the data can be transmitted after the time period using the uplink grant without transmission of the SR.

In some examples, the data includes at least two data packets (e.g., voice data packets) bundled (or to be bundled) together. In these and other examples, operations of the process 1000 can include identifying a first bundling point for the at least two data packets according to a first bundling pattern and a second bundling point for the at least two data packets according to a second bundling pattern. A first time between the first bundling point and the SR occasion and a second time between the second bundling point and the SR occasion can each be determined. The at least two data packets can then be bundled together using either the first bundling pattern or the second bundling pattern based on the shorter of the first time and the second time, thereby reducing latency between receipt and transmission of the data packets.

Figure 11:
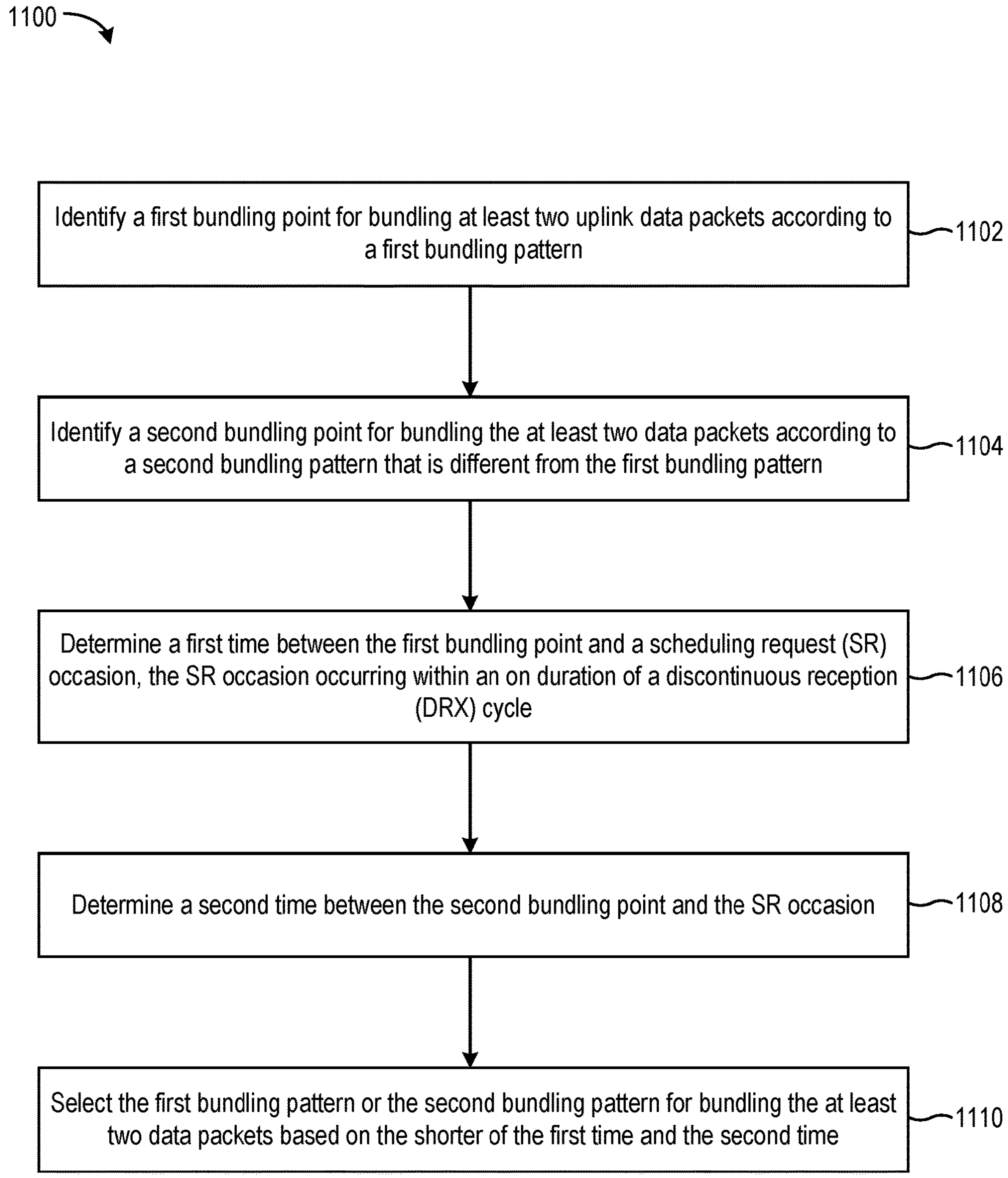

FIG. 11 illustrates an example process 1100 for low power data communications in accordance with an aspect of the present disclosure. In some examples, the process 1100 is performed by one or more of the devices or systems described herein, such as the UE 101 or the RAN node 111 or components thereof.

Operations of the process 1100 include identifying (1102) a first bundling point for bundling at least two uplink data packets (e.g., voice data packets) according to a first bundling pattern. A second bundling point for bundling the at least two uplink data packets according to a second bundling pattern can also be identified (1104). For example, the first bundling pattern can include bundling a later-arriving packet of the at least two data packets with an earlier-arriving packet of the at least two packets, and the first bundling point can include an arrival time of the earlier-arriving packet. In this example, the second bundling pattern can include bundling an earlier-arriving packet of the at least two data packets with a later-arriving packet of the at least two packets, and the second bundling point can include an arrival time of the later-arriving packet. In some examples, the number of data packets to be bundled together is based on factors such as the power level of the device transmitting the data packets, a SIM (e.g., multi-SIM) configuration of the device, or combinations of them, among others. Such a number can be signaled by a higher layer (e.g., an application layer) of the device.

A first time between the first bundling point and a SR occasion can be determined (1106). Similarly, a second time between the second bundling point and the SR occasion can be determined (1108). In some examples, the SR occasion is one occurring within an on duration of a DRX cycle. The first bundling pattern or the second bundling pattern can then be selected (1110) for bundling the at least two data packets based on the shorter of the first time and the second time. Once bundled according to the selected bundling pattern, the bundled data packets can be transmitted in accordance with the techniques described herein. For instance, in some examples, such as where the first bundling pattern is the selected bundling pattern, transmission of a SR is delayed (e.g., prevented) during a time period that begins at the first bundling point and continues for the first time. An absence of an uplink grant during the time period can be detected (e.g., by the transmitting device), and the SR can be transmitted after the time period in response to the absence of the uplink grant. In cases where an uplink grant is detected during the time period, the data can be transmitted after the time period using the uplink grant without transmission of the SR.

Figure 12:
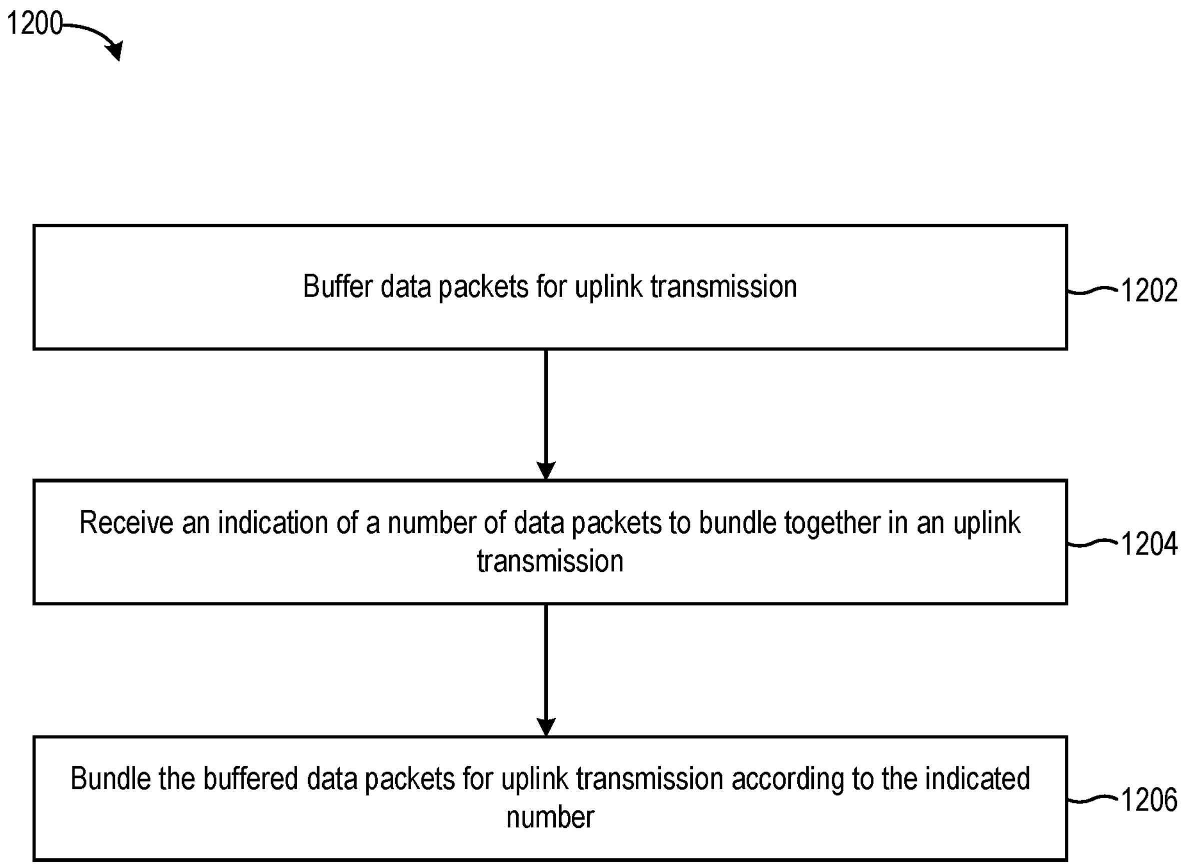

FIG. 12 illustrates an example process 1200 for adaptively bundling data packets in accordance with an aspect of the present disclosure. In some examples, the process 1200 is performed by one or more of the devices or systems described here, such as the UE 101 or the RAN node 11I or components thereof.

Operations of the process 1200 include buffering (1202) data packets designated for uplink transmission. For example, a device, such as the UE 101 or a component thereof, can receive uplink data packets (e.g., uplink voice data packets) and can temporarily store the data packets in a buffer. The device can also receive (1204) an indication of a number of packets to adaptively bundle together in an uplink transmission. Such an indication can be received from, for example, a higher layer (e.g., an application layer) or another entity (e.g., a RAN node 111) and can be based on a variety of factors. For example, a higher layer could indicate the number of packets to bundle together based on the battery power remaining on the device. As another example, a higher layer could indicate the number of packets to bundle together for different bands or band combinations of multi-SIM. The device can then bundle (1206) the buffered data packets according to the indicated number and transmit the bundled data packets to the designated node in accordance with the techniques described herein.

Figure 13:
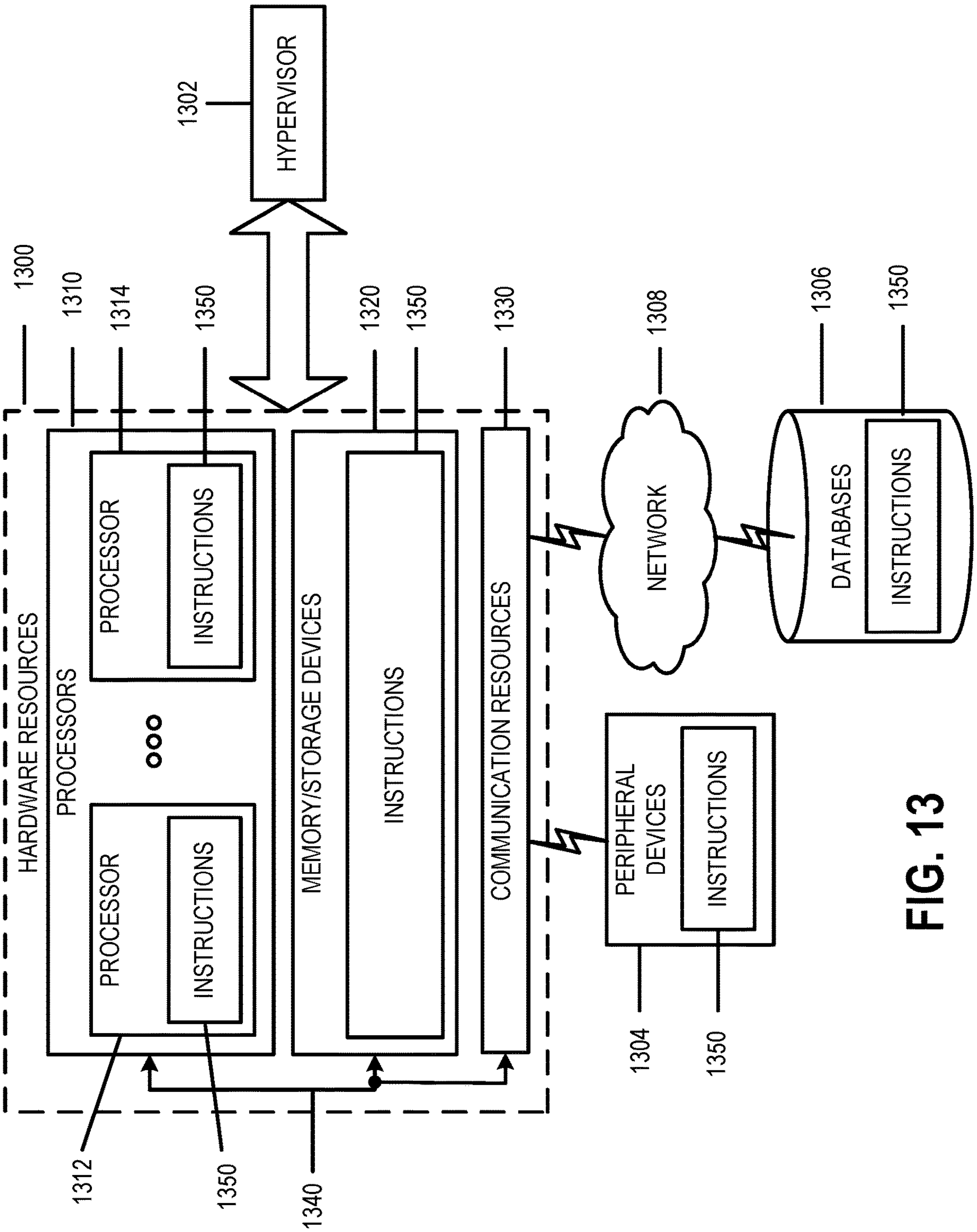
FIG. 13 illustrates an example computer system.

FIG. 13 is a block diagram illustrating components, according to some examples, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1300 including one or more processors (or processor cores) 1310, one or more memory/storage devices 1320, and one or more communication resources 1330, each of which may be communicatively coupled via a bus 1340. For examples where node virtualization (e.g., NFV) is utilized, a hypervisor 1302 may be executed to provide an execution environment for one or more network slices/sub-slices to utilize the hardware resources 1300.

The processors 1310 may include, for example, a processor 1312 and a processor 1314. The processor(s) 1310 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1320 may include main memory, disk storage, or any suitable combination thereof. The memory/storage devices 1320 may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1330 may include interconnection or network interface components or other suitable devices to communicate with one or more peripheral devices 1304 or one or more databases 1306 via a network 1308. For example, the communication resources 1330 may include wired communication components (e.g., for coupling via USB), cellular communication components, NFC components, Bluetooth® (or Bluetooth® Low Energy) components, Wi-Fi® components, and other communication components.

Instructions 1350 may comprise software, a program, an application, an applet, an app, or other executable code for causing at least any of the processors 1310 to perform any one or more of the methodologies discussed herein. The instructions 1350 may reside, completely or partially, within at least one of the processors 1310 (e.g., within the processor's cache memory), the memory/storage devices 1320, or any suitable combination thereof. Furthermore, any portion of the instructions 1350 may be transferred to the hardware resources 1300 from any combination of the peripheral devices 1304 or the databases 1306. Accordingly, the memory of processors 1310, the memory/storage devices 1320, the peripheral devices 1304, and the databases 1306 are examples of computer-readable and machine-readable media.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The methods described here may be implemented in software, hardware, or a combination thereof, in different implementations. In addition, the order of the blocks of the methods may be changed, and various elements may be added, reordered, combined, omitted, modified, and the like. Various modifications and changes may be made as would be obvious to a person skilled in the art having the benefit of this disclosure. The various implementations described here are meant to be illustrative and not limiting. Many variations, modifications, additions, and improvements are possible. Accordingly, plural instances may be provided for components described here as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of implementations as defined in the claims that follow.

What is claimed is:

1. A method, comprising:

identifying a first bundling point for bundling at least two uplink data packets according to a first bundling pattern;

identifying a second bundling point for bundling the at least two uplink data packets according to a second bundling pattern that is different from the first bundling pattern;

determining a first time duration between the first bundling point and a scheduling request (SR) occasion, the SR occasion occurring within an on duration of a discontinuous reception (DRX) cycle;

determining a second time duration between the second bundling point and the SR occasion;

selecting the first bundling pattern or the second bundling pattern for bundling the at least two uplink data packets based on whichever is shorter between the first time duration and the second time duration, wherein a number of the at least two uplink data packets bundled together is determined based on a battery power level remaining on a device that transmits the at least two uplink data packets; and transmitting the at least two uplink data packets based on the selected bundling pattern.

2. The method of claim 1, wherein the at least two uplink data packets comprise voice data packets.

3. The method of claim 1, wherein the first bundling pattern comprises bundling an earlier-arriving packet of the at least two uplink data packets with a later-arriving packet of the at least two uplink data packets, and wherein the first bundling point comprises an arrival time of the later-arriving packet.

4. The method of claim 1, wherein the first bundling pattern comprises bundling a later-arriving packet of the at least two uplink data packets with an earlier-arriving packet of the at least two uplink data packets, and wherein the first bundling point comprises an arrival time of the earlier-arriving packet.

5. The method of claim 1, wherein the number of the at least two uplink data packets bundled together is further determined based on a multiple-subscriber identification module (SIM) configuration of the device.

6. The method of claim 1, wherein the first bundling pattern is the selected bundling pattern, the method comprising:

delaying transmission of a SR during a time period that begins at the first bundling point and continues for the first time duration.

7. A user equipment (UE) comprising:

memory;

a transceiver; and a processor coupled to the memory and configured to, when executing instructions stored in the memory, cause the UE to perform operations, the operations comprising:

identifying a first bundling point for bundling at least two uplink data packets according to a first bundling pattern;

identifying a second bundling point for bundling the at least two uplink data packets according to a second bundling pattern that is different from the first bundling pattern;

determining a first time duration between the first bundling point and a scheduling request (SR) occasion, the SR occasion occurring within an on duration of a discontinuous reception (DRX) cycle;

determining a second time duration between the second bundling point and the SR occasion;

selecting the first bundling pattern or the second bundling pattern for bundling the at least two uplink data packets based on whichever is shorter between the first time duration and the second time duration, wherein a number of the at least two uplink data packets bundled together is determined based on a battery power level remaining on the UE that transmits the at least two uplink data packets; and transmitting the at least two uplink data packets based on the selected bundling pattern.

8. The UE of claim 7, wherein the at least two uplink data packets comprise voice data packets.

9. The UE of claim 7, wherein the first bundling pattern comprises bundling an earlier-arriving packet of the at least two uplink data packets with a later-arriving packet of the at least two uplink data packets, and wherein the first bundling point comprises an arrival time of the later-arriving packet.

10. The UE of claim 7, wherein the first bundling pattern comprises bundling a later-arriving packet of the at least two uplink data packets with an earlier-arriving packet of the at least two uplink data packets, and wherein the first bundling point comprises an arrival time of the earlier-arriving packet.

11. The UE of claim 7, wherein the number of the at least two uplink data packets bundled together is further determined based on a multiple-subscriber identification module (SIM) configuration of the UE.

12. The UE of claim 7, wherein the first bundling pattern is the selected bundling pattern, the operations comprising:

delaying transmission of a SR during a time period that begins at the first bundling point and continues for the first time duration.

13. A baseband processor configured to, when executing instructions stored in a memory, perform operations comprising:

identifying a first bundling point for bundling at least two uplink data packets according to a first bundling pattern;

identifying a second bundling point for bundling the at least two uplink data packets according to a second bundling pattern that is different from the first bundling pattern;

determining a first time duration between the first bundling point and a scheduling request (SR) occasion, the SR occasion occurring within an on duration of a discontinuous reception (DRX) cycle;

determining a second time duration between the second bundling point and the SR occasion;

selecting the first bundling pattern or the second bundling pattern for bundling the at least two uplink data packets based on whichever is shorter between the first time duration and the second time duration, wherein a number of the at least two uplink data packets bundled together is determined based on a battery power level remaining on a device that comprises the baseband processor and transmits the at least two uplink data packets; and transmitting the at least two uplink data packets based on the selected bundling pattern.

14. The baseband processor of claim 13, wherein the at least two uplink data packets comprise voice data packets.

15. The baseband processor of claim 13, wherein the first bundling pattern comprises bundling an earlier-arriving packet of the at least two uplink data packets with a later-arriving packet of the at least two uplink data packets, and wherein the first bundling point comprises an arrival time of the later-arriving packet.

16. The baseband processor of claim 13, wherein the first bundling pattern comprises bundling a later-arriving packet of the at least two uplink data packets with an earlier-arriving packet of the at least two uplink data packets, and wherein the first bundling point comprises an arrival time of the earlier-arriving packet.

17. The baseband processor of claim 13, wherein the number of the at least two uplink data packets bundled together is further determined based on a multiple-subscriber identification module (SIM) configuration of the device.

18. The baseband processor of claim 13, wherein the first bundling pattern is the selected bundling pattern, the operations comprising:

delaying transmission of a SR during a time period that begins at the first bundling point and continues for the first time duration.

* * * * *